(12) United States Patent
Shiina

(10) Patent No.: US 9,988,073 B2
(45) Date of Patent: Jun. 5, 2018

(54) STEERING SYSTEM

(71) Applicant: JTEKT CORPORATION, Osaka-shi, Osaka (JP)

(72) Inventor: Akihiko Shiina, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days. days.

(21) Appl. No.: 15/176,532

(22) Filed: Jun. 8, 2016

(65) Prior Publication Data

US 2016/0368528 A1 Dec. 22, 2016

(30) Foreign Application Priority Data

Jun. 16, 2015 (JP) .................................. 2015-121123

(51) Int. Cl.
| | |
|---|---|
| B62D 5/04 | (2006.01) |
| B62D 5/00 | (2006.01) |
| B62D 3/04 | (2006.01) |
| B62D 5/24 | (2006.01) |
| F16D 11/00 | (2006.01) |
| F16D 13/00 | (2006.01) |

(52) U.S. Cl.
CPC ............ *B62D 5/0454* (2013.01); *B62D 3/04* (2013.01); *B62D 5/003* (2013.01); *B62D 5/043* (2013.01); *B62D 5/0409* (2013.01); *B62D 5/0415* (2013.01); *B62D 5/24* (2013.01); *F16D 11/00* (2013.01); *F16D 13/00* (2013.01)

(58) Field of Classification Search
CPC ... B62D 5/0415; B62D 5/0403; B62D 5/0409
See application file for complete search history.

(56) References Cited

U.S. PATENT DOCUMENTS

| | | | | |
|---|---|---|---|---|
| 7,726,439 | B2 * | 6/2010 | Akuta ...................... | B62D 3/12 180/402 |
| 7,878,294 | B2 * | 2/2011 | Morikawa ............ | B62D 5/0415 180/204 |
| 9,586,614 | B2 * | 3/2017 | Izutani ................... | B62D 5/003 |
| 9,683,639 | B2 * | 6/2017 | Kogure .................... | F16H 15/50 |
| 2005/0205336 | A1 | 9/2005 | Yamasaki et al. | |
| 2005/0288143 | A1 * | 12/2005 | Menjak ................. | B62D 5/008 475/29 |

(Continued)

FOREIGN PATENT DOCUMENTS

| | | |
|---|---|---|
| DE | 101 03 642 A1 | 8/2002 |
| DE | 102 07 913 A1 | 5/2003 |

(Continued)

OTHER PUBLICATIONS

Nov. 28, 2016 Extended European Search report issued in Patent Application No. 16174138.4.

*Primary Examiner* — Kevin Hurley

(74) *Attorney, Agent, or Firm* — Oliff PLC

(57) ABSTRACT

A steering system includes: a steering shaft to which a steering member is coupled; a worm wheel attached to the steering shaft so as to be rotatable integrally with the steering shaft; a housing that houses the worm wheel; an output shaft that is coaxial with the steering shaft and rotatable relative to the steering shaft and coupled to a steering operation mechanism; and a clutch mechanism that enables and disables transmission of power between the steering shaft and the output shaft. The clutch mechanism is housed and disposed in an internal space in the housing.

17 Claims, 15 Drawing Sheets

(56) References Cited

U.S. PATENT DOCUMENTS

| | | | | |
|---|---|---|---|---|
| 2008/0156572 A1* | 7/2008 | Kasahara | ............... | B62D 5/003 |
| | | | | 180/402 |
| 2013/0161116 A1 | 6/2013 | Tashiro | | |
| 2013/0253772 A1* | 9/2013 | Tashiro | ................. | B62D 5/001 |
| | | | | 701/43 |
| 2017/0217475 A1* | 8/2017 | Shiina | .................... | B62D 5/003 |

FOREIGN PATENT DOCUMENTS

| | | |
|---|---|---|
| EP | 1577193 A1 | 9/2005 |
| EP | 1939069 A1 | 7/2008 |
| EP | 1985520 A1 | 10/2008 |
| EP | 3064413 A1 | 9/2016 |
| JP | 2006-123857 A | 5/2006 |
| JP | 4347100 B2 | 10/2009 |
| JP | 4927608 B2 | 5/2012 |
| JP | 2013-132950 A | 7/2013 |
| WO | 87/06900 A1 | 11/1987 |

* cited by examiner

STEERING SYSTEM

INCORPORATION BY REFERENCE

The disclosure of Japanese Patent Application No. 2015-121123 filed on Jun. 16, 2015 including the specification, drawings and abstract, is incorporated herein by reference in its entirety.

BACKGROUND OF THE INVENTION

1. Field of the Invention

The invention relates to a steering system.

2. Description of the Related Art

A steer-by-wire system has been proposed in which a steering member and a steering operation mechanism are not mechanically coupled together and in which a steering angle of a steering wheel is detected by an angle sensor so that a driving force exerted by a steering operation actuator controlled in accordance with a sensor output from the angle sensor is transmitted to the steering operation mechanism (see, for example, Japanese Patent Application Publication No. 2013-132950 (JP 2013-132950 A)). On the other hand, when the steer-by-wire system is mounted in a vehicle, an appropriate measure needs to be taken so that steered wheels can be steered even when the steering operation actuator or the like becomes defective.

Japanese Patent No. 4927608 and Japanese Patent No. 4347100 disclose, as a steering system for which the above-described measure has been taken, a configuration in which the steering member and the steering operation mechanism are coupled together via an electromagnetic clutch mechanism and in which the steering member and the steering operation mechanism are mechanically uncoupled from each other during a normal operation and are mechanically coupled together when an abnormality occurs.

When mounted in the steering system, a clutch mechanism (electromagnetic clutch) may be, for example, interposed between an intermediate shaft and a steering column. However, in this case, the clutch mechanism may interfere with peripheral members.

SUMMARY OF THE INVENTION

An object of the invention is to provide a steering system in which a clutch mechanism can be mounted without interfering with peripheral members.

According to an aspect of the invention, a steering system includes: a steering shaft that transmits rotation of a steering member; a steering operation mechanism that steers steered wheels; a housing having an internal space in which at least a part of the steering shaft is housed; an output shaft that is rotatable relative to the steering shaft and coupled to a steering operation mechanism; and a clutch mechanism having a mechanical portion provided to enable the steering shaft and the output shaft to be coupled together and uncoupled from each other, and a driving force generating portion that generates a driving force allowing the mechanical portion to couple the steering shaft and the output shaft together and to uncouple the steering shaft and the output shaft from each other, the clutch mechanism enabling and disabling transmission of power between the steering shaft and the output shaft. The clutch mechanism is housed and disposed in the internal space in the housing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
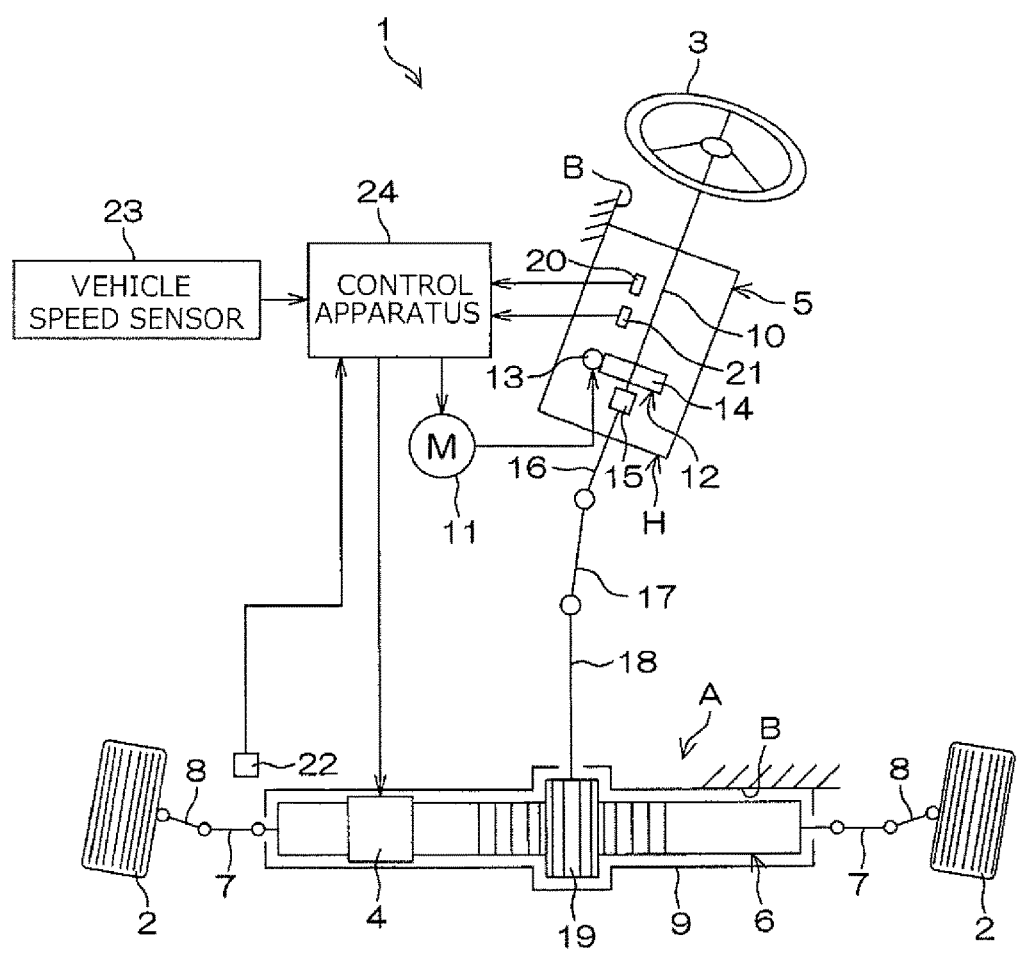
FIG. 1 is a diagram depicting a general configuration of a steering system according to a first embodiment of the invention.

Embodiments of the invention will be described below in detail with reference to the attached drawings. FIG. 1 is a diagram depicting a general configuration of a steering system 1 according to a first embodiment of the invention. The steering system 1 adopts what is called a seer-by-wire system in which a steering member 3 such as a steering wheel is mechanically uncoupled from a steering operation mechanism A allowing steering of steered wheels 2.

In the steering system 1, an operation of a steering operation actuator 4 is controlled according to a rotating operation of the steering member 3. The operation is converted into linear motion of a steered shaft 6 in a vehicle width direction. The linear motion of the steered shaft 6 is converted into a steering motion of the right and left steered wheels 2 to be steered, thereby turning of the vehicle is achieved. Specifically, the steering operation actuator 4 includes a motor. A driving force of the motor is converted into linear motion in the axial direction of the steered shaft 6 by a motion conversion mechanism (a ball screw apparatus or the like) provided in connection with the steered shaft 6.

The linear motion of the steered shaft 6 is transmitted to tie rods 7 connected to respective opposite ends of the steered shaft 6 to cause respective knuckle arms 8 to pivot. Consequently, steering of the steered wheels 2 supported by the knuckle arms 8 is achieved. The steering operation mechanism A includes the steered shaft 6, the tie rods 7, and the knuckle arms 8. A steered shaft housing 9 that supports the steered shaft 6 is fixed to a vehicle body B.

The steering member 3 is coupled to a steering shaft 10. The steering shaft 10 is rotatably supported by a housing H of a steering column 5 fixed to the vehicle body B. The steering shaft 10 can rotate integrally with the steering member 3. A first motor 11 and a first speed reducer (transmission mechanism) 12 are attached to the steering shaft 10. The first speed reducer 12 decelerates output rotation of the first motor 11. The first speed reducer 12 includes a worm shaft 13 and a worm wheel (gear) 14. The worm shaft 13 is rotationally driven by the first motor 11 and the worm wheel 14 meshes with the worm shaft 13 and is fixed to the steering shaft 10.

The steering shaft 10 is coupled to the steering operation mechanism A via the clutch mechanism 15. Specifically, the steered shaft 6 of the steering operation mechanism A includes a rack shaft. To a pinion shaft 18 having, at a distal end thereof, a pinion 19 that engages with the rack shaft, an output shaft 16 is connected via an intermediate shaft 17. The output shaft 16 is provided coaxially with the steering shaft 10 so as to be rotatable relative to the steering shaft 10. The clutch mechanism 15 is interposed between the steering shaft 10 and the output shaft 16.

In connection with the steering shaft 10, the steering system 1 is provided with a steering angle sensor 20 that detects a steering angle of the steering member 3. The steering shaft 10 is provided with a torque sensor 21 that detects a steering torque applied to the steering member 3. The torque sensor 21 is housed in the housing H of the steering column 5. In connection with the steered wheels 2, the steering system 1 is provided with a steered angle sensor 22 and a vehicle speed sensor 23. The steered angle sensor 22 detects a steered angle of the steered wheels 2. The vehicle speed sensor 23 detects a vehicle speed. Detection signals from various sensors including the sensors 20 to 23 are input to a control apparatus 24 including an electronic control unit (ECU) including a microcomputer. The control apparatus 24 sets a target steered angle based on a steering angle and a vehicle speed. The steering angle is detected by the steering angle sensor 20. The vehicle speed is detected by the vehicle speed sensor 23. The control apparatus 24 controls and drives the steering operation actuator 4 based on a deviation between the target steered angle and the steered angle detected by the steered angle sensor 22.

During a normal operation of the vehicle, the control apparatus 24 keeps the clutch mechanism 15 in a disengaged state to mechanically disconnect the steering member 3 and the steering operation mechanism A from each other. In this state, based on the detection signals output by the steering angle sensor 20, the torque sensor 21, and the like, the control apparatus 24 controls and drives the first motor 11 so as to apply, to the steering member 3, an appropriate reaction force acting in a direction opposite to a direction in which the steering member 3 is steered. Output rotation of the first motor 11 is decelerated (amplified) by the first speed reducer 12, and the resultant rotation is transmitted to the steering member 3 via the steering shaft 10. That is, during a normal operation of the vehicle, the first motor 11 and the first speed reducer 12 function as a reaction force generating mechanism.

On the other hand, when, for example, in the event of abnormal conditions such as when an ignition of the vehicle is off and the steer-by-wire system is malfunctioning, the control apparatus 24 brings the clutch mechanism 15 into an engaged state to mechanically couple the steering member 3 and the steering operation mechanism A together. This enables the steering operation mechanism A to be directly operated using the steering member 3. A configuration is adopted in which the steering shaft 10 and the steering operation mechanism A can be mechanically coupled together via the clutch mechanism 15. This makes the steer-by-wire system mechanically fail-safe.

For example, when one of the steering operation actuator 4 and the first motor 11 malfunctions, the control apparatus 24 controls and drives the other of the steering operation actuator 4 and the first motor 11 so as to apply a steering assist force to the steering operation mechanism A based on the detection signals output by the steering angle sensor 20, the torque sensor 21, and the like. Output rotation of the first motor 11 is decelerated by the first speed reducer 12, and the resultant rotation is transmitted to the steering operation mechanism A via the output shaft 16, the intermediate shaft 17, and the pinion shaft 18. Output rotation of the steering operation actuator 4 is transmitted to the steering operation mechanism A by the motion conversion mechanism. That is, if an abnormality occurs, the first motor 11 and the first speed reducer 12 or the steering operation actuator 4 and the motion conversion mechanism function as a steering assist mechanism.

In particular, when the steering operation actuator 4 is malfunctioning, the first motor 11 and the first speed reducer 12 can be used as a steering assist mechanism when an abnormality occurs and also as a reaction force generating mechanism during a normal operation. This configuration enables a reduction in costs as compared to a configuration in which the steering assist mechanism and the reaction force generating mechanism are separately provided. The reaction force generating mechanism has not only the first motor 11 but also the first speed reducer 12, which amplifies the output from the first motor 11. Thus, a high rotary torque can be generated as a reaction force. Consequently, a reaction force of a desired magnitude can be applied to the steering member 3.

Figure 2:
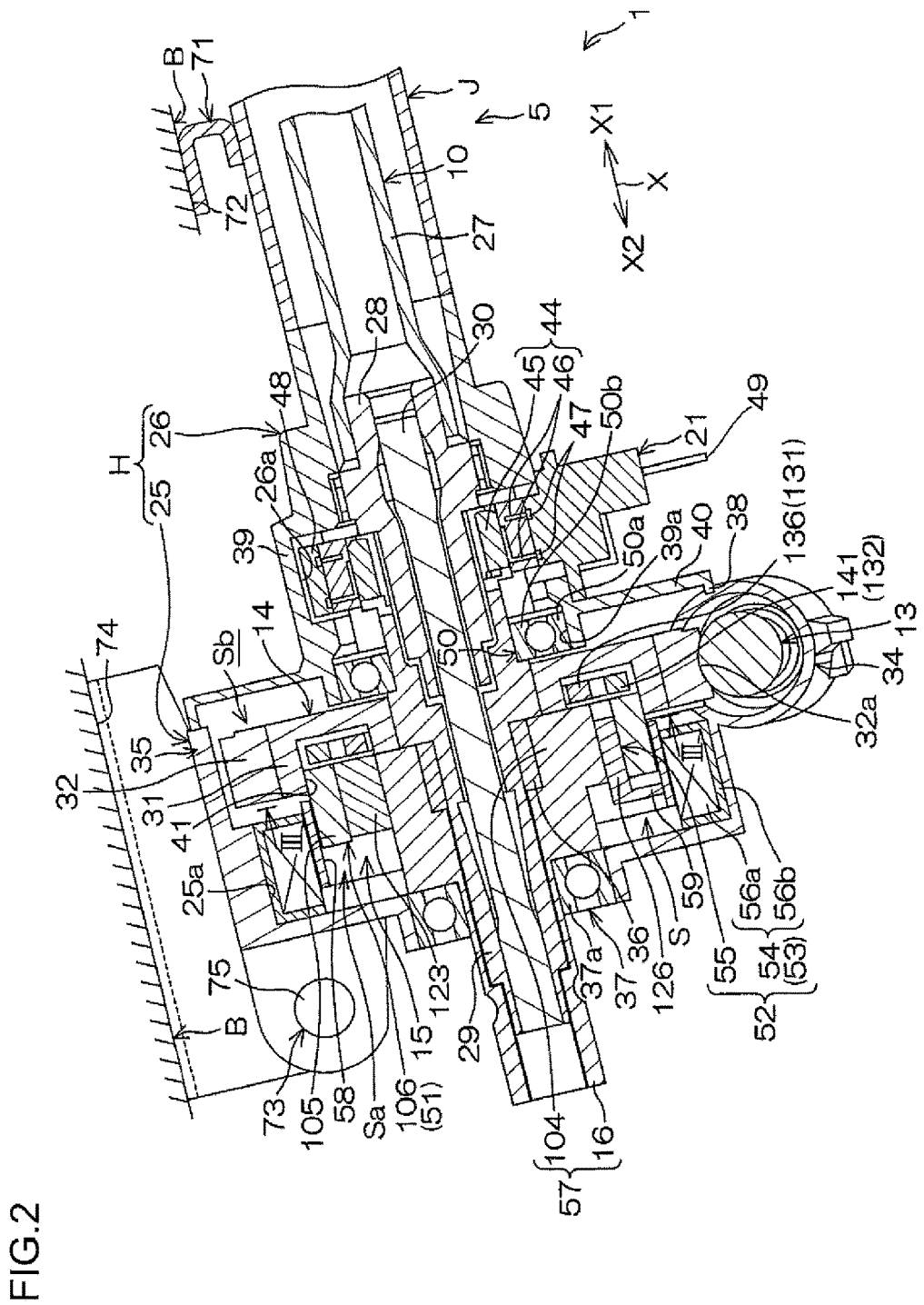
FIG. 2 is a sectional view of a housing depicted in FIG. 1.

The steering column 5 has the housing H in which at least the first speed reducer 12 is housed. The clutch mechanism 15 is housed in an internal space S (see FIG. 2) in the housing H. FIG. 2 is a sectional view of the housing H. The sectional view in FIG. 2 is taken along the section line II-II in FIG. 3 described below.

The steering shaft 10 includes a middle shaft 27, an input shaft 28, an inner shaft 29, and a torsion bar 30. The middle shaft 27 is connected to the steering member 3 (see FIG. 1). The input shaft 28 is coaxially fixed to the middle shaft 27. The worm wheel 14 is externally fixedly fitted over the inner shaft 29. The torsion bar 30 couples the input shaft 28 and the inner shaft 29 together in line. When a steering torque is input to the input shaft 28 via the middle shaft 27, torsion bar 30 is elastically torsionally deformed. Consequently, the input shaft 28 and the inner shaft 29 rotate relative to each other. The steering torque is detected by the torque sensor 21 based on a rate of relative rotation between the input shaft 28 and the inner shaft 29.

The steering column 5, which supports the steering shaft 10, has a cylindrical jacket J, a sensor housing 26, and a speed reducer housing 25. The cylindrical jacket J houses at least a part of the middle shaft 27. The sensor housing 26 is disposed below the steering shaft 10 with respect to the jacket J in the axial direction (on a steering operation mechanism A side) to house at least a part of the torque sensor 21 and to hold the torque sensor 21. The speed reducer housing 25 is disposed below the steering shaft 10 with respect to the sensor housing 26 in the axial direction to house the first speed reducer 12. The sensor housing 26 and the speed reducer housing 25 are included in the housing H.

The steering column 5 is attached to a predetermined portion 72 of a vehicle body B by use of an upper attachment structure 71 disposed on a rear side of the vehicle and to a predetermined portion 74 of the vehicle body B by use of a lower attachment structure 73 disposed on a front side of the vehicle. The jacket J is supported by the upper attachment structure 71, and the speed reducer housing 25 is supported by the lower attachment structure 73. In this state, the steering shaft 10 is supported in an oblique orientation (the oblique orientation in which the steering member 3 (see FIG. 1) is positioned above) with respect to a front-rear direction of the vehicle.

The steering column 5 is supported so as to be able to swing around a tilt center shaft 75. The steering column 5 is swung and tilted around the tilt center shaft 75. A tilt adjusting function to adjust a height position of the steering member 3 (see FIG. 1) is achieved by the upper attachment structure 71 and the lower attachment structure 73. The lower attachment structure 73 functions as a tilt hinge mechanism.

The torque sensor 21 is shaped like a ring that surrounds the steering shaft 10 and is fitted on and supported by an inner periphery 26a of the sensor housing 26. The sensor housing 26 is fixed to the speed reducer housing 25. The sensor housing 26 includes an outer tube 38, an inner tube 39, and an annular wall 40. The outer tube 38 is in abutting contact with an upper end of the speed reducer housing 25. The inner tube 39 supports an outer ring 50a of a first bearing 50 on an inner periphery 39a of the inner tube 39. The annular wall 40 connects the outer tube 38 and the inner tube 39 together.

The torque sensor 21 detects a steering torque based on a magnetic flux generated in a magnetic-circuit forming mechanism 44 provided in connection with the input shaft 28 and the inner shaft 29. The magnetic-circuit forming mechanism 44 includes a multipolar magnet 45 and a pair of magnetic yokes 46 to form a magnetic circuit. The multipolar magnet 45 is coupled to one of the input shaft 28 and the inner shaft 29 so as to be rotatable integrally therewith. The magnetic yokes 46 are disposed in a magnetic field of the multipolar magnet 45 and coupled to the other of the input shaft 28 and the inner shaft 29 so as to be rotatable integrally therewith.

The torque sensor 21 includes a pair of magnetic force collecting rings 47, a magnetic-flux detecting element (not depicted in the drawings) such as a Hall IC, and an annular main body 48 formed of a resin and holding the magnetic force collecting rings 47a. The magnetic force collecting rings 47 are magnetically coupled to the respective magnetic yokes 46. The magnetic-flux detecting element such as a Hall IC detects a magnetic flux between magnetic force collecting portions (not depicted in the drawings) of the magnetic force collecting rings 47. A wire 49 extends outward from the main body 48 of the torque sensor 21 in a radial direction. The sensor housing 26 supports the inner shaft 29 so that the inner shaft 29 is rotatable via the first bearing 50. The inner ring 50b of the first bearing 50 is fitted over the inner shaft 29 so as to be rotatable integrally with the inner shaft 29.

The speed reducer housing 25 is formed by a tubular worm shaft housing portion 34 and a worm wheel housing portion 35 that are formed of a single material and that cross each other. The worm shaft housing portion 34 houses and holds a worm shaft 13. The worm wheel housing portion 35 houses and holds a worm wheel 14. The worm wheel housing portion 35 is fixed to the sensor housing 26. The worm wheel 14 is coupled to an upper end of the inner shaft 29 in the axial direction so as to be rotatable integrally with the inner shaft 29 and to be immovable in the axial direction. The worm wheel 14 includes an annular core metal portion 31 and a synthetic resin member 32. The core metal portion 31 is bound to the inner shaft 29 so as to be rotatable integrally with the inner shaft 29. The synthetic resin member 32 surrounds the core metal portion 31 to form teeth 32a on an outer peripheral surface of the core metal portion 31. The core metal portion 31 is inserted into a mold when, for example, a resin is molded into the synthetic resin member 32. The core metal portion 31 and the synthetic resin member 32 are bound together so as to be rotatable integrally with each other.

The output shaft 16 protrudes downward (toward steering operation mechanism A) from the worm wheel housing portion 35 in the axial direction. The output shaft 16 is disposed coaxially with the inner shaft 29 so as to surround an outer periphery of the inner shaft 29. A very small clearance is formed between an inner periphery of the output shaft 16 and the outer periphery of the inner shaft 29. The output shaft 16 is supported coaxially with the inner shaft 29 so as to be rotatable relative to the inner shaft 29, by a second bearing 36 provided such that the output shaft 16 is interposed between the second bearing 36 and the outer periphery of the inner shaft 29. As the second bearing 36, a rolling bearing as depicted in FIG. 2 may be adopted or a plain bearing may be adopted. The output shaft 16 is connected to the steering operation mechanism A (see FIG. 1) via the intermediate shaft 17 (see FIG. 1) and the like.

The speed reducer housing 25 supports the output shaft 16 via a third bearing 37 so that the output shaft 16 is rotatable. The third bearing 37 is disposed below the worm wheel 14 (closer to the steering operation mechanism A) in the axial direction of the steering shaft 10. An inner ring 37a of the third bearing 37 is fitted over the output shaft 16 so as to be rotate together therewith. The internal space S in the housing H is partitioned into a first space Sa and a second space Sb by the worm wheel 14. The first space Sa is provided on a lower side with respect to the worm wheel 14 in the axial direction of the steering shaft 10 (closer to the steering operation mechanism A). The second space Sb is provided on an upper side with respect to the worm wheel 14 in the axial direction of the steering shaft 10 (closer to the steering member 3).

The clutch mechanism 15 includes a mechanical portion 51 and a driving portion 52. The mechanical portion 51 includes a two-way clutch 106 described below. The driving portion 52 includes an annular solenoid 54 and an actuating member 55. The solenoid 54 is an example of a driving force generating portion 53. The actuating member 55 receives an electromagnetic force (driving force) from the driving force generating portion 53 to actuate the mechanical portion 51. The mechanical portion 51 is housed and disposed in the first space Sa, which is a lower portion of the internal space S in the housing H.

The solenoid 54 is housed in the first space Sa. That is, the solenoid 54 is disposed on the same side as the mechanical portion with respect to the worm wheel 14 in the axial direction of the steering shaft 10. The solenoid 54 is disposed so as to surround an outer periphery of the mechanical portion 51 (two-way clutch 106 described below), namely, the solenoid 54 is disposed radially outward of the mechanical portion 51. More specifically, the solenoid 54 surrounds an outer periphery of an outer ring 105 of the two-way clutch 106. The solenoid 54 is fixed to an outer peripheral surface 25a of the speed reducer housing 25. The solenoid 54 and the mechanical portion 51 overlap each other in the axial direction of the steering shaft 10.

The solenoid 54 has a coil 56a and a core 56b. The coil 56a is a copper wire or the like wound coaxially with the steering shaft 10. The core 56b is arranged in proximity to the coil 56a. An inner peripheral portion of the solenoid 54 functions as an attracting portion that attracts an armature 58 of the actuating member 55. In the first embodiment, the second space Sb, which is an upper part of the internal space S in the housing H, is a narrow space. Accordingly, it is impossible to dispose a part of the clutch mechanism 15 (for example, the solenoid 54) in the second space Sb.

Figure 3:
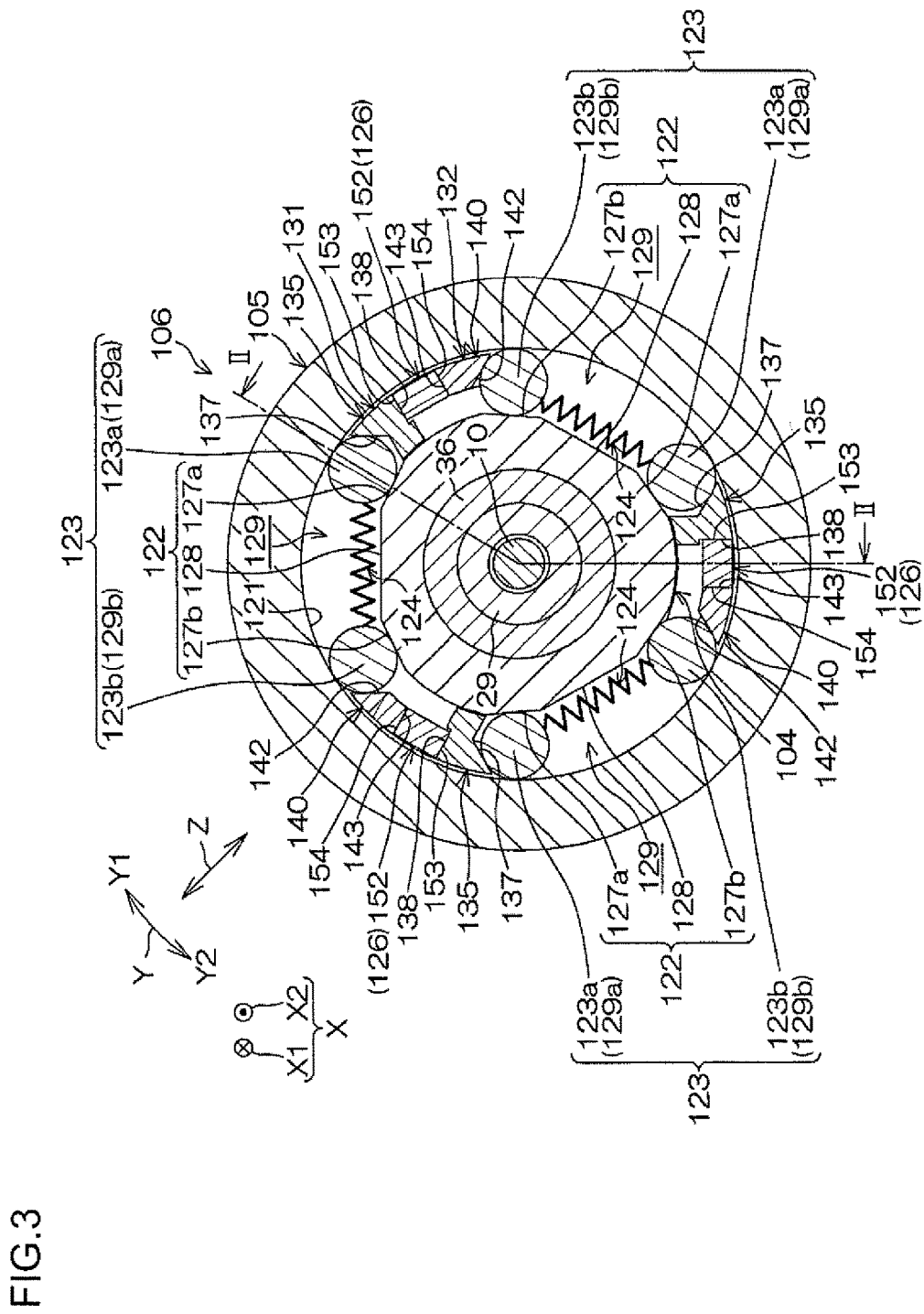
FIG. 3 is a sectional view of the housing taken along the section line III-III in FIG. 2.
Figure 4:
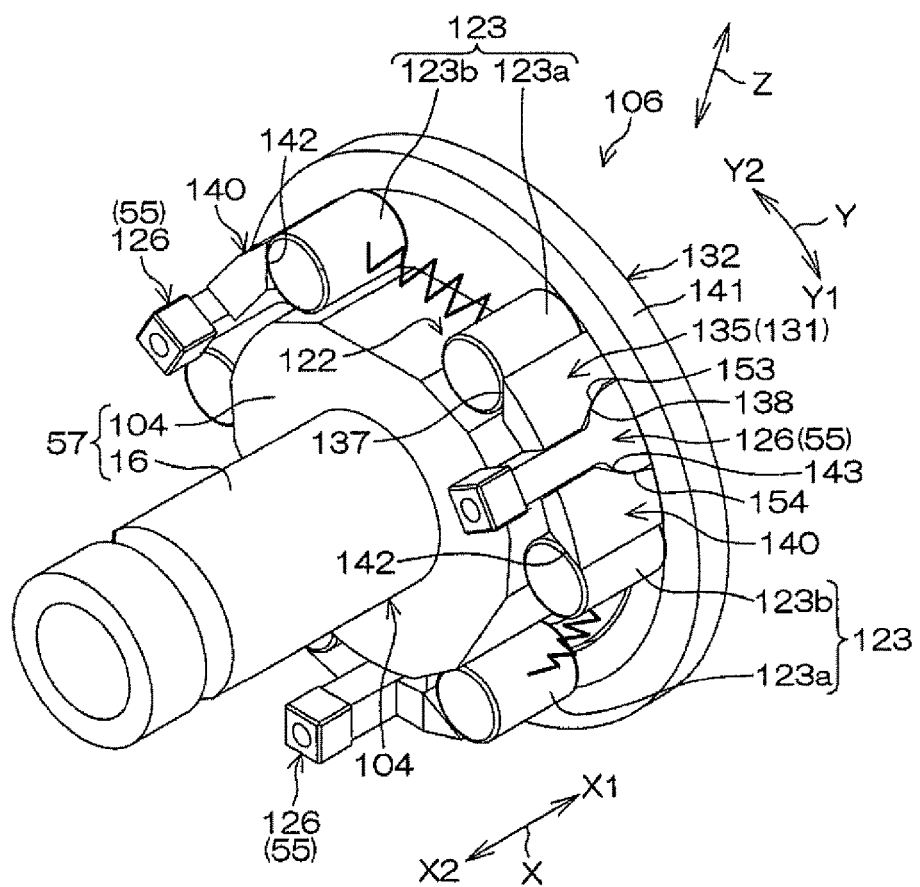
FIG. 4 is a perspective view of a two-way clutch depicted in FIG. 3.

FIG. 3 is a sectional view taken along the section line III-III in FIG. 2. FIG. 4 is a perspective view of the two-way clutch 106 depicted in FIG. 3. FIG. 4 depicts the two-way clutch 106 from which an outer ring 105 has been removed. FIG. 3 depicts only the configuration of wedge members 126 as the actuating member 55, and illustration of the other components of the actuating member 55 is omitted. With reference to FIGS. 2 to 4, the two-way clutch 106 will be described.

The axial direction of the steering shaft 10 is hereinafter referred to as the axial direction X. The axial direction of an inner ring 104 and the axial direction of the outer ring 105 coincide with the axial direction X. Of the axial direction X, an axial direction toward a rear side of the vehicle is referred to as a first axial direction X1. Of the axial direction X, an axial direction toward a front side of the vehicle is referred to as a second axial direction X2.

A direction along a rotating direction of the steering shaft 10 is referred to as a circumferential direction Y. A circumferential direction of the inner ring 104, a circumferential direction of the outer ring 105, and the circumferential direction of the worm wheel 14 coincide with the circumferential direction Y. Of the circumferential direction Y, a circumferential direction that is a clockwise direction as viewed from a second axial direction X2 side is referred to as a first circumferential direction Y1. Of the circumferential direction Y, a circumferential direction that is a counterclockwise direction as viewed from the second axial direction X2 side is referred to as a second circumferential direction Y2. The direction of a turning radius of the steering shaft 10 is referred to as a radial direction Z. A radial direction of the inner ring 104, a radial direction of the outer ring 105, and a radial direction of the worm wheel 14 coincide with the radial direction Z.

The two-way clutch 106 includes the inner ring 104, the outer ring 105, roller pairs 123, a first pressing member 131, and a second pressing member 132. The inner ring 104 is coaxially coupled to the output shaft 16 (see FIG. 2). The outer ring 105 is coaxially coupled to the inner shaft 29 (see FIG. 2) and is rotatable relative to the inner ring 104. The roller pairs 123 are disposed in the circumferential direction Y such that each roller pair 123 is provided in a corresponding one of one or more (in this embodiment, for example, three) wedge spaces 129 formed by an outer periphery of the inner ring 104 and an inner periphery of the outer ring 105. Each of the roller pairs 123 includes a first roller 123a and a second roller 123b. The first and second pressing members 131, 132 are disposed so as to be rotatable relative to each other around the steering shaft 10. The first pressing member 131 moves in the second circumferential direction Y2 to press and move the first rollers 123a of the roller pairs 123 in the second circumferential direction Y2. The second pressing member 132 moves in the first circumferential direction Y1 to press and move the second rollers 123b of the roller pairs 123 in the first circumferential direction Y1.

As depicted in FIG. 2, the outer ring 105 is fixedly fitted in an annular groove 41 formed in a lower surface (output shaft 16-side surface) of the core metal portion 31 of the worm wheel 14. Fixing the outer ring 105 to the core metal portion 31 allows the outer ring 105 to be coupled to the steering shaft 10 with a simple configuration. The outer ring 105 is formed of a metal material such as steel, and may be formed integrally with the core metal portion 31. In the present embodiment, the core metal portion 31 and the outer ring 105 are separate members due to a difference in demanded hardness between the core metal portion 31 and the outer ring 105. However, a configuration may be adopted in which the outer ring 105 is integrated with the core metal portion 31 of the worm wheel 14.

The inner ring 104 is integrated with the output shaft 16 as depicted in FIG. 2. That is, an output shaft member 57 integrally including the inner ring 104 and the output shaft 16 is provided. The output shaft member 57 is formed of a metal material, for example, steel. The inner ring 104 and the output shaft 16 may be provided using different members. The inner ring 104 and the output shaft 16 may be formed of a synthetic resin material.

As depicted in FIG. 3, each of the wedge spaces 129 is defined by a cylindrical surface 121 and a cam surface 122. The cylindrical surface 121 is formed around the inner periphery of the outer ring 105. The cam surface 122 is formed around the outer periphery of the inner ring 104 and faces the cylindrical surface 121 in the radial direction Z. Each wedge space 129 is narrower toward opposite ends thereof in the circumferential direction Y. In each wedge space 129, an elastic member 124 is disposed which elastically presses the first and second rollers 123a, 123b in the circumferential direction Y in which the first and second rollers 123a, 123b move away from each other. The elastic member 124 may be, for example, a coil spring. The cam surfaces 122 each include a pair of inclined surfaces 127a, 127b and a flat spring support surface 128. The inclined surfaces 127a, 127b incline in opposite directions in the circumferential direction Y. The flat spring support surface 128 connects the inclined surfaces 127a, 127b together.

Each roller pair includes the first roller 123a on a first circumferential direction Y1 side of the roller pair and the second roller 123b on the second circumferential direction Y2 side of the roller pair. The first pressing member 131 includes pillar-like first pressing portions 135 and an annular first support portion 136 (see FIG. 2). The first support portion 136 collectively supports first ends of the respective first pressing portions 135. The first support portion 136, for example, supports a plurality of the first pressing portions 135 from inside in the radial direction Z. The first pressing member 131 is provided such that the first support portion 136 is coaxial with the inner ring 104 and the outer ring 105 and is rotatable relative to the inner ring 104 and the outer ring 105. The first pressing portions 135 are identical in number (in the present embodiment, three) to the roller pairs 123 and are shaped like pillars extending in the axial direction X and disposed at regular intervals in the circumferential direction Y. The first pressing portions 135 and the first support portion 136 may be integrally formed using a synthetic resin material or a metal material. The first pressing member 131 may function as a cage that holds the roller pairs 123 and the elastic members 124.

The second pressing member 132 includes pillar-shaped second pressing portions 140 and an annular second support portion 141 (see FIG. 4). The second support portion 141 collectively supports the second pressing portions 140. The second support portion 141, for example, supports a plurality of the second pressing portions 140 from outside in the radial direction Z. The second pressing member 132 is provided such that the second support portion 141 is coaxial with the inner ring 104 and the outer ring 105 and is rotatable relative to the inner ring 104 and the outer ring 105. The second pressing portions 140 are identical in number (in the present embodiment, three) to the roller pairs 123 and are shaped like pillars extending in the axial direction X and disposed at regular intervals in the circumferential direction Y. The second pressing portions 140 and the second support portion 141 may be integrally formed using a synthetic resin material or a metal material. The second pressing member 132 may function as a cage that holds the roller pairs 123 and the elastic members 124.

As depicted in FIG. 3 and FIG. 4, the first pressing member 131 and the second pressing member 132 are combined together such that the first pressing portions 135 and the second pressing portions 140 are alternately aligned in the circumferential direction Y. As depicted in FIG. 3 and FIG. 4, between each first pressing portion 135 and a corresponding one of the second pressing portions 140, one wedge member 126 is disposed. The first pressing portion 135 can press a first roller 123a included in a corresponding one of the roller pairs 123. The second pressing portion 140 (hereinafter referred to as the "second pressing portion 140 for the adjacent roller pair 123") can press a second roller 123b included in another roller pair 123 that is adjacent to the corresponding roller pair 123 on the first circumferential direction Y1 side. At the second circumferential direction Y2 side of the first pressing portion 135, another second pressing portion 140 is disposed via the corresponding roller pair 123. That other second pressing portion 140 is disposed to presses a second roller 123b paired with the first roller 123a that can be pressed by the first pressing portion 135. At the first circumferential direction Y1 side of the first pressing portion 135, the second pressing portion 140 for the adjacent roller pair 123 is disposed via the corresponding wedge member 126.

As depicted in FIG. 3 and FIG. 4, on a surface of each first pressing portion 135 located on the second circumferential direction Y2 side thereof, a first pressing surface 137 is formed which is configured to press the first roller 123a of the corresponding roller pair 123. The first pressing surface 137 includes, for example, a flat surface. The first pressing surface 137 is not limited to the one including a flat surface but may come into surface contact, line contact, or point contact with the first roller 123a.

As depicted in FIG. 3 and FIG. 4, a first mating sliding contact surface 138 is formed on a surface of each first pressing portion 135 located on the first circumferential direction Y1 side thereof. A first sliding contact surface 153 is formed on a surface of each wedge member 126 located on the second circumferential direction Y2 side thereof. The first sliding contact surface 153 and the first mating sliding contact surface 138 are shaped to come into line contact with each other. Specifically, in the present embodiment, the first mating sliding contact surface 138 includes a curved surface C (see FIG. 7 or any other relevant figure) that is curved so as to be recessed in the second circumferential direction Y2. The first sliding contact surface 153 includes a curved surface D (see FIG. 7 or any other relevant figure) that is curved so as to protrude in the second circumferential direction Y2. The curved surface C has a radius of curvature set smaller than the radius of curvature of the curved surface D. The curved surface C and the curved surface D are in line contact with each other. In other words, the first sliding contact surface 153 and the first mating sliding contact surface 138 are in line contact with each other. A position on the curved surface C where the curved surface C contacts the curved surface D moves on the curved surface C in conjunction with movement of the wedge member 126 in the axial direction X. In a normal state, the position is prevented from deviating from the curved surface C.

As depicted in FIG. 3 and FIG. 4, on a surface of each second pressing portion 140 located on the first circumferential direction Y1 side thereof, a second pressing surface 142 is formed which presses the second roller 123b of the corresponding roller pair 123. The second pressing surface 142 includes, for example, a flat surface. The second pressing surface 142 is not limited to the one including a flat surface but may come into surface contact, line contact, or point contact with the second roller 123b.

As depicted in FIG. 3 and FIG. 4, a second mating sliding contact surface 143 is formed on a surface of each second pressing portion 140 located on the second circumferential direction Y2 side thereof. A second sliding contact surface 154 is formed on a surface of each wedge member 126 located on the second circumferential direction Y2 side thereof. The second sliding contact surface 154 and the second mating sliding contact surface 143 are shaped to come into line contact with each other. Specifically, in the present embodiment, the second mating sliding contact surface 143 includes a curved surface E (see FIG. 7 or any other relevant figure) that is curved so as to be recessed in the first circumferential direction Y1. The second sliding contact surface 154 includes a curved surface F (see FIG. 7 or any other relevant figure) that is curved so as to protrude in the first circumferential direction Y1. The curved surface E has a radius of curvature set smaller than the radius of curvature of the curved surface F. The curved surface E and the curved surface F are in line contact with each other. In other words, the second sliding contact surface 154 and the second mating sliding contact surface 143 are in line contact with each other. A position on the curved surface E where the curved surface E contacts the curved surface F moves on the curved surface E in conjunction with movement of the wedge member 126 in the axial direction X. In the normal state, the position is prevented from deviating from the curved surface E.

Figure 5A:
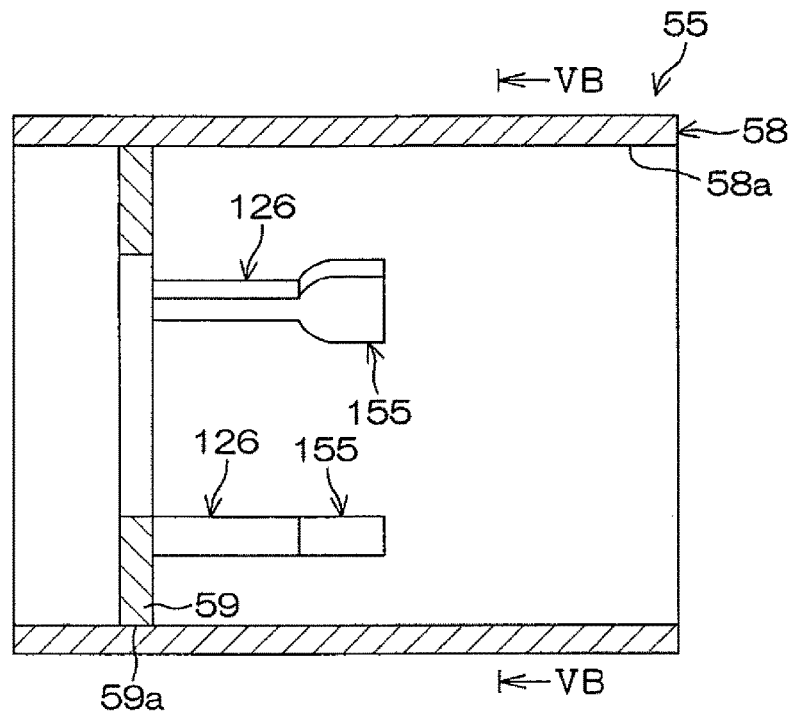
FIGS. 5A and 5B are diagrams illustrating an actuating member depicted in FIG. 4.
Figure 5B:
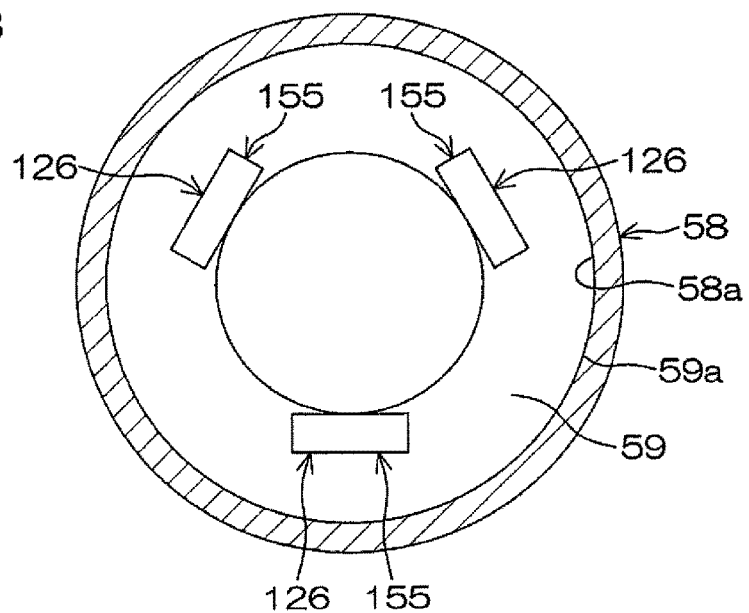

FIGS. 5A and 5B are diagrams illustrating the actuating member 55. FIG. 5A depicts a sectional view taken along a section line extending along the axial direction X. FIG. 5B depicts a sectional view taken along the section line VB-VB in FIG. 5A. With reference to FIG. 2, FIG. 5A, and FIG. 5B, the actuating member 55 will be described. The actuating member 55 includes the cylindrical armature 58, a sidewall portion 59, and the wedge members 126. The sidewall portion 59 is supported by the armature 58 and projects inward from an inner periphery 58a of the armature 58 in a radial direction of the armature 58 (that is, the radial direction Z). The wedge members 126 are identical in number to the roller pairs 123 supported by the sidewall portion 59. That is, the armature 58, the sidewall portion 59, and the wedge members 126 are configured to be integrally movable.

The armature 58 is formed of a magnetic material (for example, steel) and configured to be rotatable relative to the inner ring 104 and the outer ring 105. The armature 58 is externally fitted over the outer ring 105 of the two-way clutch 106. The armature 58 surrounds an outer periphery of a second axial direction X2-side portion of the outer ring 105. More specifically, as depicted in FIG. 2, the armature 58 is housed in the clearance between an inner periphery of the solenoid 54 and the outer periphery of the outer ring 105.

The sidewall portion 59 includes a circular-ring plate that is perpendicular to a circumferential surface of the cylindrical armature 58. An outer peripheral portion 59a of the sidewall portion 59 is fixed to an inner periphery 58a at a middle portion of the armature 58 in the axial direction X. The sidewall portion 59 may be formed of a magnetic material or any other material (for example, a synthetic resin material). The wedge members 126 extend along the axial direction X. As depicted in FIG. 5B, the wedge members 126 are disposed at regular intervals in the circumferential direction Y. The wedge members 126 may be formed of a magnetic material or any other material (for example, a synthetic resin material).

Figure 6A:
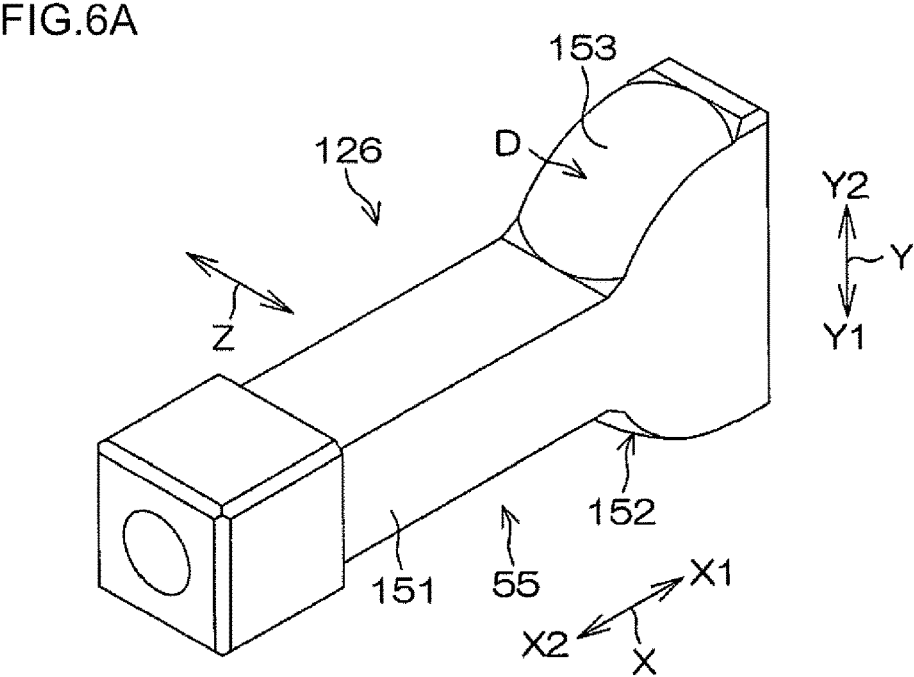
FIGS. 6A and 6B are perspective views of a wedge member of the actuating member.
Figure 6B:
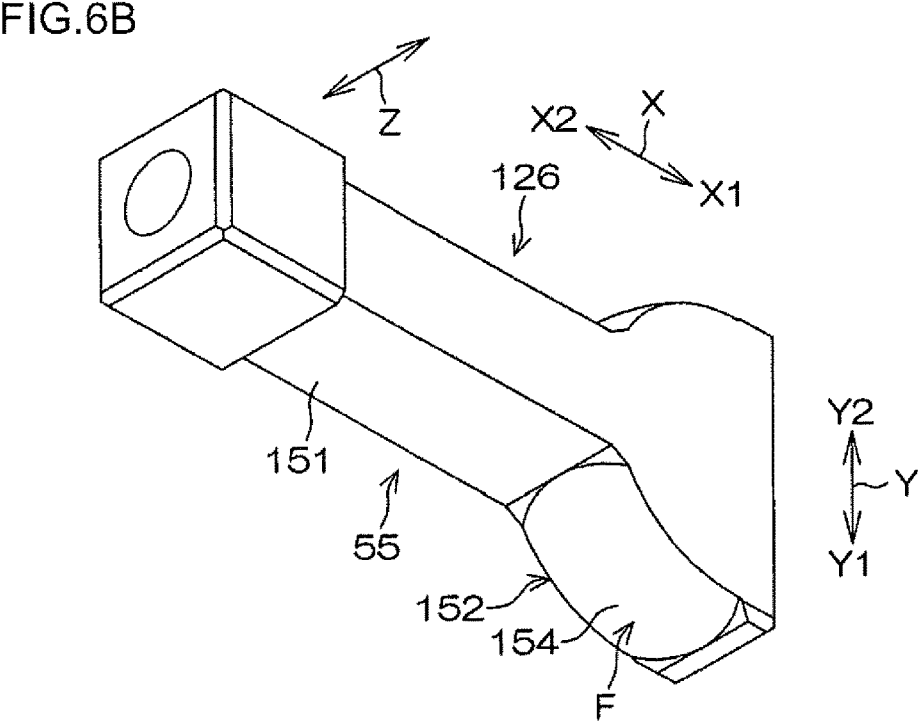

The actuating member 55 is configured such that the armature 58 is coaxial with the inner ring 104 and the outer ring 105 and that the actuating member 55 is movable in the axial direction X. FIG. 6A and FIG. 6B are perspective views depicting a configuration of each of the wedge members 126 of the actuating member 55.

In FIG. 6A and FIG. 6B, the wedge member 126 is viewed in two different directions. Each wedge member 126 includes a shaft portion 151 and a wedge portion 152. The wedge portion 152 spreads in the opposite directions of the circumferential direction Y at a distal end of the shaft portion 151 (a first axial direction X1-side end of the shaft portion 151). The wedge portion 152 includes the first sliding contact surface 153 and the second sliding contact surface 154. The first sliding contact surface is provided on a second circumferential direction Y2-side surface of the wedge portion 152. The second sliding contact surface 154 is provided on a first circumferential direction Y1-side surface of the wedge portion 152. The wedge portion 152 comes into sliding contact with the first and second pressing members 131, 132 from a first axial direction X1 side. The first sliding contact surface 153 and the second sliding contact surface 154 are shaped as described above.

Figure 7:
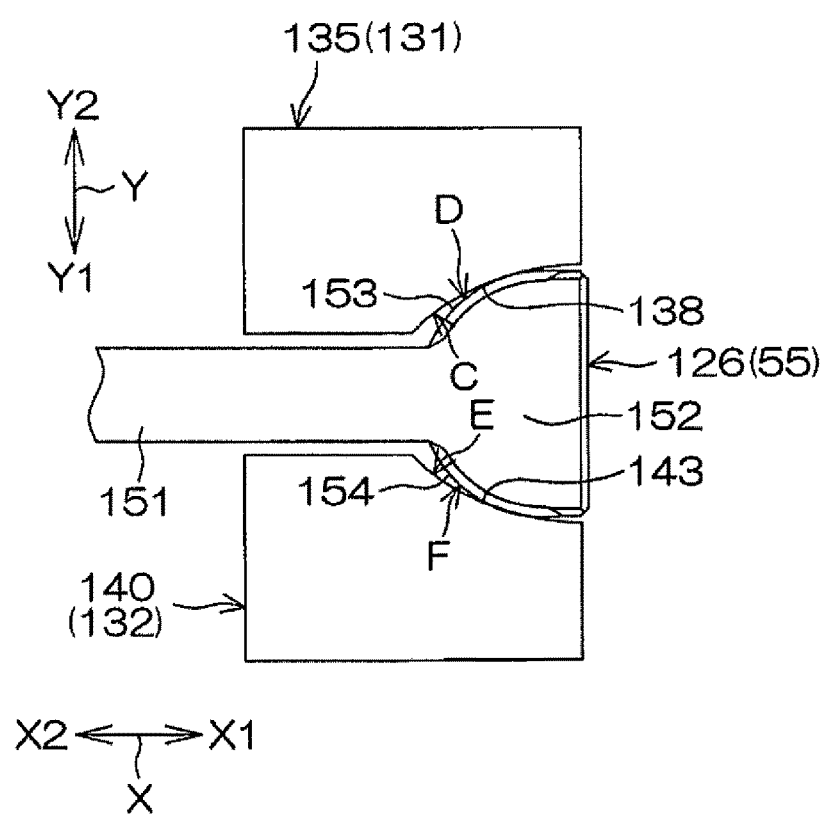
FIG. 7 is a diagram illustrating a positional relation between the actuating member and both first and second pressing members observed while the two-way clutch is engaged.
Figure 8:
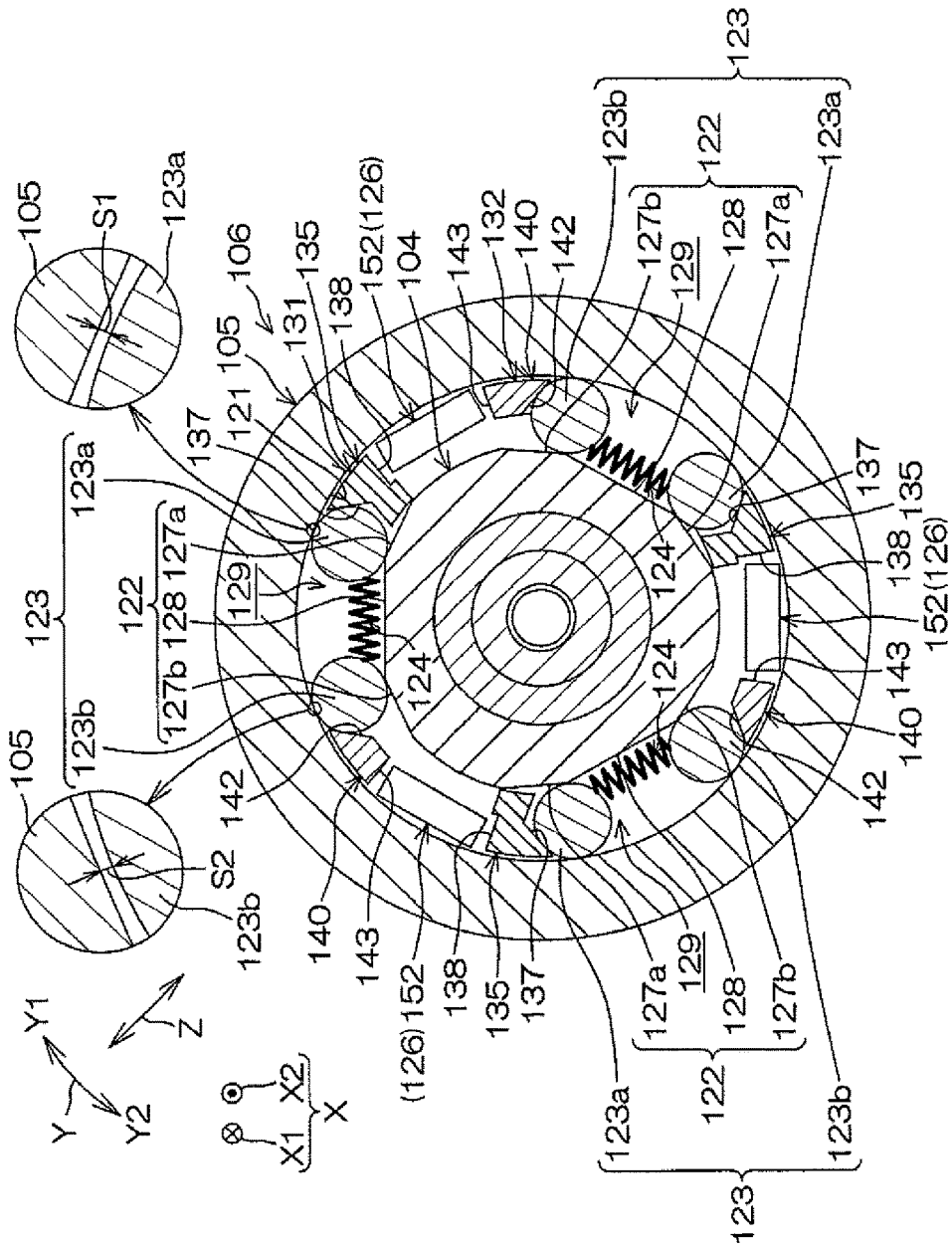
FIG. 8 is a sectional view of the two-way clutch in a released state.
Figure 9:
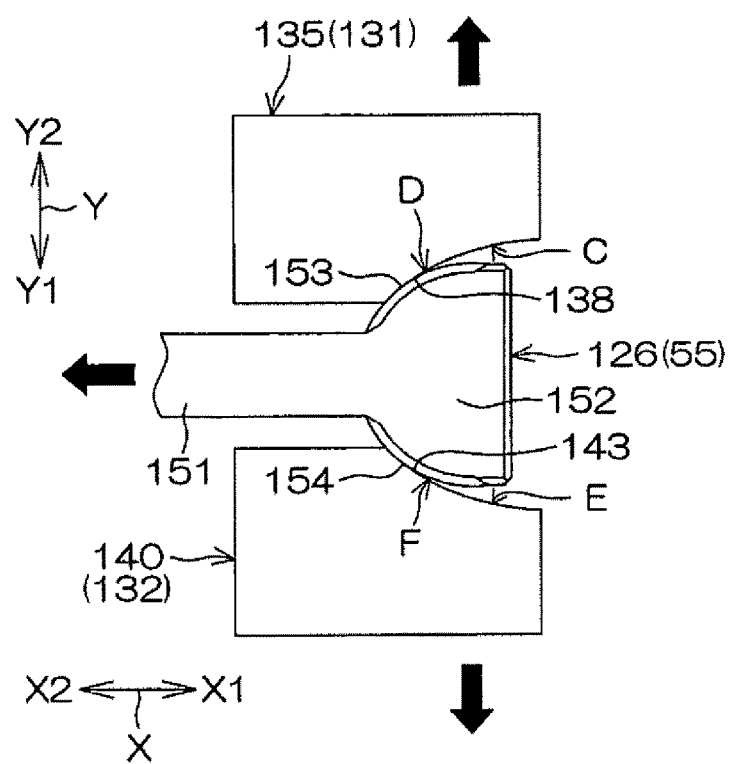
FIG. 9 is a diagram illustrating a positional relation between the actuating member and both the first and second pressing members observed while the two-way clutch is released.

FIG. 7 is a diagram illustrating a positional relation between the actuating member 55 and both the first and second pressing members 131, 132 observed while the two-way clutch 106 is engaged. FIG. 8 is a sectional view of the two-way clutch 106 in a released state. FIG. 9 is a diagram illustrating a positional relation between the actuating member 55 and both the first and second pressing members 131, 132 observed while the two-way clutch 106 is released.

With reference to FIG. 2, FIG. 3, and FIGS. 7 to 9, engagement and disengagement of the clutch mechanism 15 will be described.

To allow the clutch mechanism 15 to be engaged, power feeding to the solenoid 54 is turned off. In this state, the solenoid 54 does not attract the armature 58 of the actuating member 55 in the second axial direction X2. Thus, each of the wedge members 126 of the actuating member 55 is placed in a first position (the position depicted in FIG. 7). With the wedge member 126 placed in the first position, the two-way clutch 106 is engaged. In this engaged state, as depicted in FIG. 3, each elastic member 124 elastically presses the corresponding first roller 123a toward a first engagement position 129a at an end of the corresponding wedge space 129 located on the first circumferential direction Y1 side thereof. Thus, the first rollers 123a are engaged with the outer periphery of the inner ring 104 and the inner periphery of the outer ring 105. In this state, as depicted in FIG. 3, each elastic member 124 elastically presses the corresponding second roller 123b toward a second engagement position 129b at an end of the corresponding wedge space 129 located on the second circumferential direction Y2 side thereof. The engaged two-way clutch 106 couples the inner shaft 29 and the output shaft 16 together, in turn mechanically coupling the steering member 3 (see FIG. 1) and the steering operation mechanism A (see FIG. 1) together.

On the other hand, to allow the clutch mechanism 15 to be disengaged, the power feeding to the solenoid 54 is turned on. When the power feeding to the solenoid 54 is switched on, the armature 58 of the actuating member 55 is attracted by the clutch mechanism 15 and drawn in the second axial direction X2 to move in the second axial direction X2 (for example, approximately 1 to 2 mm) as depicted in FIG. 9. Accordingly, each of the wedge members 126 of the actuating member 55 is placed in a second position (the position depicted in FIG. 9) located on the second axial direction X2 side with respect to the first position (the position depicted in FIG. 7).

As described above, each first sliding contact surface 153 includes the curved surface D shaped so as to protrude in the second circumferential direction Y2 and is in line contact with the corresponding first mating sliding contact surface 138. The second sliding contact surface 154 includes the curved surface F shaped so as to protrude in the first circumferential direction Y1 and is in line contact with the corresponding second mating sliding contact surface 143. In other words, the first sliding contact surface 153 and the second sliding contact surface 154 include respective portions configured such that the portions protrude in the opposite first and second circumferential directions Y1, Y2 as they extend in the first axial direction X1. The first sliding contact surface 153 and the second sliding contact surface 154 are configured to come into line contact with the mating sliding contact surfaces 138, 148, respectively. Therefore, in conjunction with movement of the actuating member 55 toward the second position on the second axial direction X2 side, the first mating sliding contact surfaces 138, that is, the first pressing portions 135 move in the second circumferential direction Y2, whereas the second mating sliding contact surfaces 143, that is, the second pressing portions 140 move in the first circumferential direction Y1.

Consequently, the first pressing portions 135 (first pressing surfaces 137) press and move the respective first rollers 123a in the second circumferential direction Y2 against the elastic pressing forces of the respective elastic members 124. Consequently, each first roller 123a leaves the first engagement position 129a (see FIG. 3). As depicted in FIG. 8, a clearance S1 is formed between each first roller 123a and the inner periphery of the outer ring 105. That is, each first roller 123a is disengaged from the outer periphery of the inner ring 104 and from the inner periphery of the outer ring 105.

The second pressing portions 140 (second pressing surfaces 142) are moved in the first circumferential direction Y1 to press and move the respective second rollers 123b in the first circumferential direction Y1 against the elastic pressing forces of the respective elastic members 124. Consequently, each second roller 123b leaves the second engagement position 129b (see FIG. 3). As depicted in FIG. 8, a clearance S2 is formed between each second roller 123b and the inner periphery of the outer ring 105. That is, each second roller 123b is disengaged from the outer periphery of the inner ring 104 and from the inner periphery of the outer ring 105.

With each of the wedge members 126 of the actuating member 55 placed at the second position, the two-way clutch 106 is released. In this released state, the rollers 123a, 123b are disengaged from the inner ring 104 and from the outer ring 105. The released two-way clutch 106 allows mechanical coupling between the inner shaft 29 and the output shaft 16 to be released. Consequently, the steering member 3 (see FIG. 1) and the steering operation mechanism A (see FIG. 1) are uncoupled from each other.

The clutch mechanism 15 is assumed to be disposed between the intermediate shaft and the steering column instead of being housed and disposed in the internal space S (see FIG. 2) in the housing H (see FIG. 2). Specifically, a driving force transmission mechanism described in Japanese Patent Application Publication No. 2013-92191 (JP 2013-92191 A) is assumed to be interposed between the intermediate shaft 17 (see FIG. 1) and the steering column 5 (see FIG. 1 or any other relevant figure). In this case, the driving force transmission mechanism is a large apparatus. Thus, a housing of the driving force transmission mechanism may interfere with the lower attachment structure 73 of the steering column 5. The intermediate shaft 17 needs to be displaced downward by a distance equal to the dimension of the housing of the driving force transmission mechanism. This may cause a fluctuation in torque (angle transmission errors) due to a bend angle of a joint portion of the intermediate shaft 17.

As described above, in the first embodiment of the invention, the clutch mechanism 15 is housed and disposed in the internal space S in the housing H. The clutch mechanism 15 is housed and disposed inside the housing H, which houses a part of the steering shaft 10, the first speed reducer 12, and the torque sensor 21. This makes it possible to avoid interference of the clutch mechanism 15 with peripheral members (for example, the lower attachment structure 73). Therefore, the clutch mechanism 15 can be provided without interfering with the peripheral members.

In the internal space S, the driving force generating portion 53 is disposed radially outward of the mechanical portion 51. That is, the driving force generating portion 53 is disposed in parallel with the mechanical portion 51 in the axial direction X. Thus, as compared to a configuration in which the driving force generating portion 53 and the mechanical portion 51 are disposed in series with each other in the axial direction X, the configuration in the first embodiment allows the driving force generating portion 53 and the mechanical portion 51 to be housed in the housing H without an increase in the size of the clutch mechanism 15 in the axial direction X. This enables suppression of an increase in the size of the steering system 1.

The two-way clutch 106 is engaged when the roller pairs 123 engage both with the inner ring 104 and with the outer ring 105. In this engaged state, the first pressing member 131 is moved in the second circumferential direction Y2, and the second pressing member 132 is moved in the first circumferential direction Y1. Consequently, (since the first pressing member 131 and the second pressing member 132 are moved in the opposite predetermined directions) the roller pairs 123 each can be pressed and moved in the directions in which the first and second rollers 123a, 123b approach one another. Thus, the roller pairs 123 are disengaged from the inner ring 104 and from the outer ring 105, allowing the two-way clutch 106 to be released. This allows the two-way clutch 106 to provide the mechanical portion 51 that couples the steering shaft 10 and the output shaft 16 together and that releases the coupling between the steering shaft 10 and the output shaft 16.

The first and second sliding contact surfaces 153, 154 of each of the wedge portions 152 include the respective portions that protrude in the opposite first and second circumferential directions Y1, Y2 as they extend in the first axial direction X1. Thus, the actuating member 55 is moved in the first axial direction X1 to allow the first pressing member 131 to move in the second circumferential direction Y2, while allowing the second pressing member 132 to move in the first circumferential direction Y1. Consequently, the roller pairs 123 each can be pressed and moved in the directions in which the first and second rollers 123a, 123b approach one another. Therefore, the two-way clutch 106 can be appropriately switched between the engaged state and the released state.

In a steering system 1 with no clutch mechanism mounted therein, the inner shaft 29 and the intermediate shaft 17 are connected together. In contrast, in the steering system 1, the output shaft 16 provided coaxially with the inner shaft 29 so as to rotatable relative to the inner shaft 29 is connected to the intermediate shaft 17. This allows the coordinates of the intermediate shaft 17 in the steering system 1 to be made equivalent to the coordinates of the intermediate shaft in the steering system with no clutch mechanism mounted therein. This makes it possible to avoid a fluctuation in torque (angle transmission errors) caused by the bend angle of the joint portion of the intermediate shaft.

Figure 10:
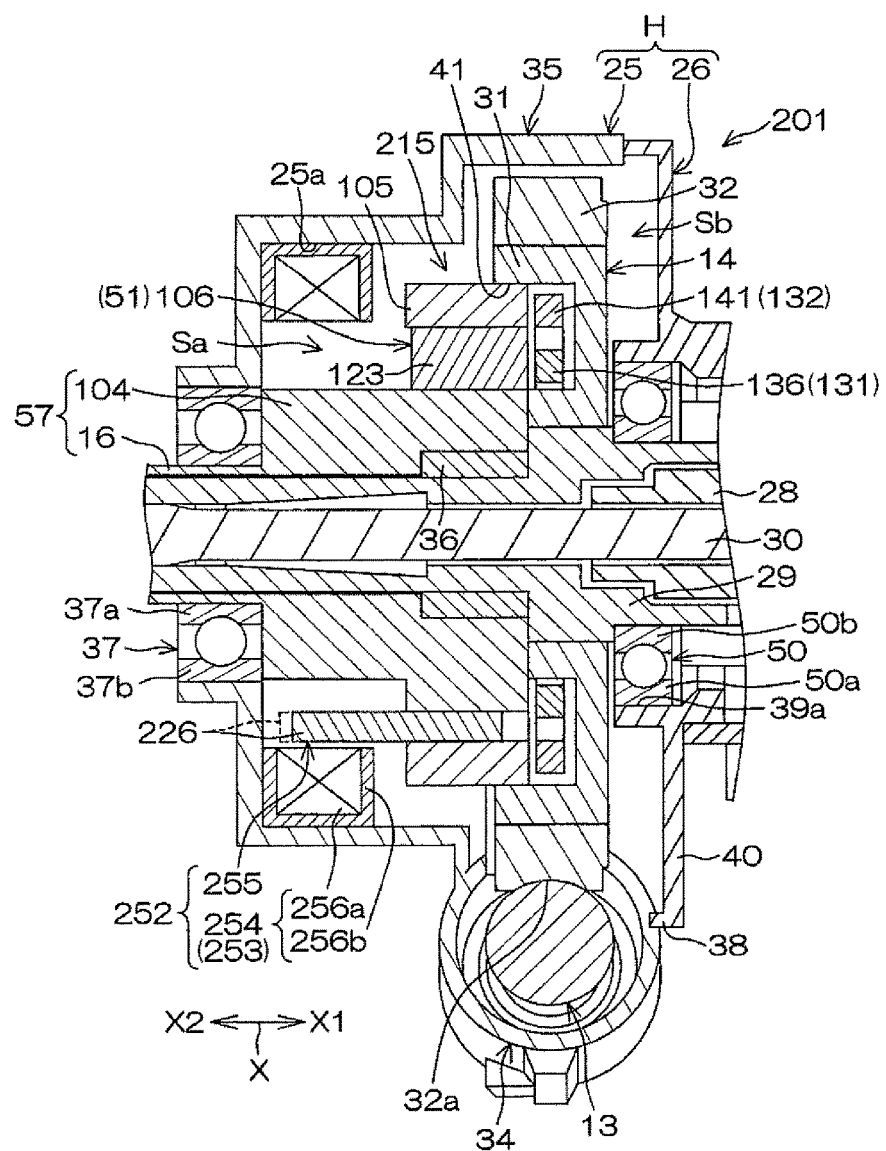
FIG. 10 is a sectional view depicting a general configuration of an important part of a steering system according to a second embodiment of the invention.

FIG. 10 is a sectional view depicting a general configuration of an important part of a steering system 201 according to a second embodiment of the invention. In the second embodiment, portions that are the same as those disclosed in the first embodiment are denoted by the same reference numerals in FIGS. 1 to 9 and descriptions of the portions will be omitted. A clutch mechanism 215 included in the steering system 201 according to the second embodiment is the same as the clutch mechanism 15 according to the first embodiment in that the clutch mechanism 215 is housed and disposed in the internal space S in the housing H and in that a driving force generating portion 253 is disposed on the same side as the mechanical portion 51 with respect to the worm wheel 14 in the axial direction of the steering shaft 10. The clutch mechanism 215 is different from the clutch mechanism 15 in that the driving force generating portion 253 is disposed in series with the mechanical portion 51 rather than in parallel with the mechanical portion 51 in the axial direction X.

The clutch mechanism 215 includes the mechanical portion 51 and a driving portion 252. The driving portion 252 includes an annular solenoid 254 and an actuating member 255. The solenoid 254 is an example of the driving force generating portion 253. The actuating member 255 receives an electromagnetic force (driving force) from the driving force generating portion 253 to actuate the mechanical portion 251. The solenoid 254 is disposed in the first space Sa, which is a lower portion of the internal space S of the housing H, and on the second axial direction X2 side with respect to the two-way clutch 106 (mechanical portion 51). More specifically, the solenoid 254 is disposed on the second axial direction X2 side with respect to the outer ring 105 and the inner ring 104. That is, the driving force generating portion 253 and the mechanical portion 51 are disposed in this order from the second axial direction X2 side toward the first axial direction X1 side.

The solenoid 254 has a circular-ring-shaped coil 256a and a core 256b. The circular-ring-shaped coil 256a is provided coaxially with the steering shaft 10 (see FIG. 1). The coil 256a is wound around the core 256b. An inner peripheral portion of the solenoid 254 functions as an attracting portion that attracts armatures 226 described below. The actuating member 255 includes the armatures 226 that are identical in number to the roller pairs 123 (see FIG. 3 or any other relevant figure). Each of the armatures 226 according to the second embodiment is configured similarly to each of the wedge members 126 according to the first embodiment except for the material of the armature. Each armature 226 is formed of a magnetic material.

In the second embodiment, the second space Sb, which is the upper portion of the internal space S in the housing H, is a narrow space, as is the case with the first embodiment. Thus, it is impossible to dispose a part of the clutch mechanism 215 (for example, the solenoid 254) in the second space Sb. To allow the clutch mechanism 215 to be engaged, power feeding to the solenoid 254 is turned off. In this state, the solenoid 254 does not attract the armatures 226 in the second axial direction X2. Thus, each armature 226 is placed in a first position (the position depicted by a continuous line in FIG. 10). With the armature 226 placed in the first position, the two-way clutch 106 is engaged (see FIG. 3).

On the other hand, to allow the clutch mechanism 215 to be disengaged, the power feeding to the solenoid 254 is turned on. When the power feeding to the solenoid 254 is switched on, each armature 226 is attracted by the clutch mechanism 215 and drawn in the second axial direction X2 to move in the second axial direction X2 (for example, approximately 1 to 2 mm). As a result, the armature 226 is placed in a second position (the position depicted by a dashed line in FIG. 10) located on the second axial direction X2 side with respect to the first position. With the armature 226 placed in the second position, the two-way clutch 106 is released (see FIG. 8).

Figure 11:
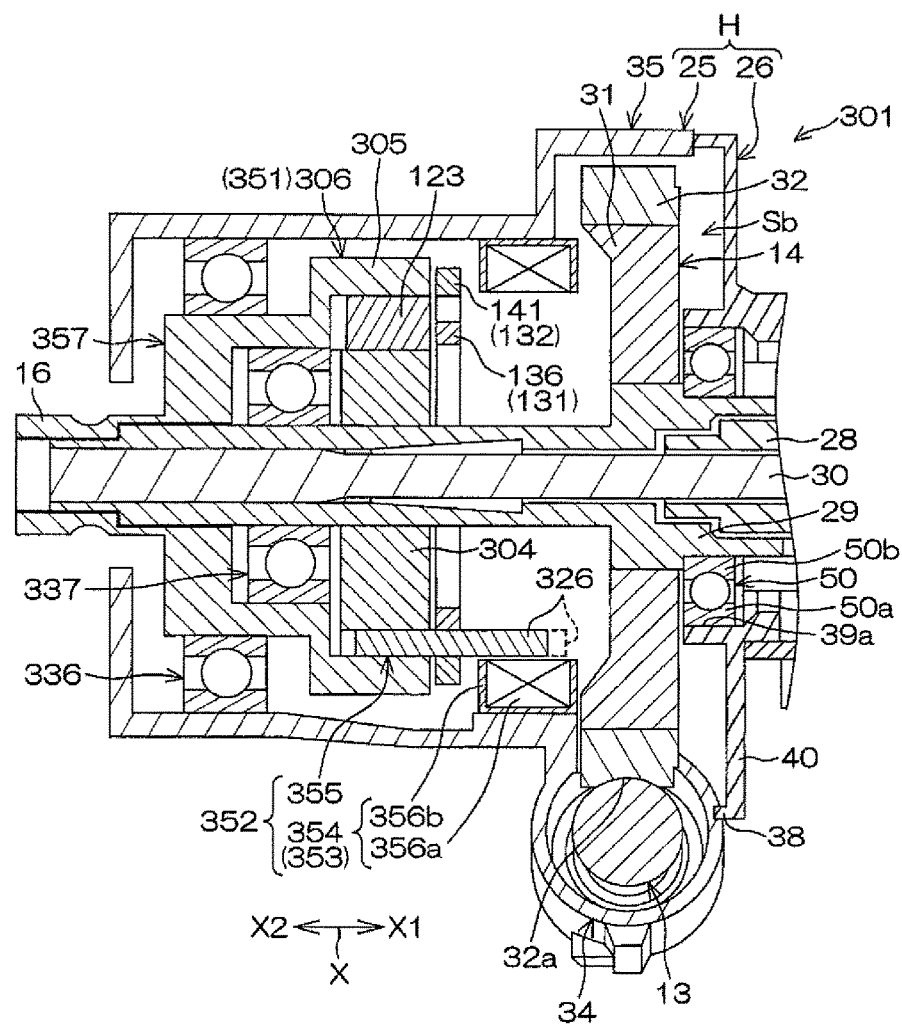
FIG. 11 is a sectional view depicting a general configuration of an important part of a steering system according to a third embodiment of the invention.

FIG. 11 is a sectional view depicting a general configuration of an important part of a steering system 301 according to a third embodiment of the invention. In the third embodiment, portions that are the same as those disclosed in the first embodiment are denoted by the same reference numerals in FIGS. 1 to 9 and descriptions of the portions will be omitted. In a clutch mechanism 315 included in the steering system 301 according to the third embodiment, a driving force generating portion 353 is disposed in series with a mechanical portion 351, as is the case with the clutch mechanism 215 according to the second embodiment. The clutch mechanism 315 according to the third embodiment is different from the clutch mechanism 215 according to the second embodiment in the order of arrangement in the axial direction X.

The clutch mechanism 315 includes a mechanical portion 351 and a driving portion 352. The mechanical portion 351 includes a two-way clutch 306. The two-way clutch 306 is provided with an inner ring 304 coaxially coupled to the inner shaft 29 (see FIG. 2) instead of the inner ring 104. The two-way clutch 306 is further provided with an outer ring 305 coaxially coupled to the output shaft 16 (see FIG. 2) instead of the outer ring 105. In these regards, the two-way clutch 306 according to the third embodiment is different from the two-way clutch 106 according to the first embodiment.

The outer ring 305 is, for example, integrated with the output shaft 16. That is, an output shaft member 357 is provided which integrally includes the outer ring 305 and the output shaft 16. The outer ring 305 and the output shaft 16 may be provided using different members. The outer ring 305 is configured equivalently to the outer ring 105 except that the outer ring 305 is coupled to the output shaft 16 rather than to the inner shaft 29.

In the present embodiment, the output shaft member 357 is supported coaxially with the inner shaft 29 so as to be rotatable relative to the inner shaft 29, by a second bearing 336 provided such that the output shaft member 357 is interposed between the second bearing 336 and the outer periphery of the inner shaft 29. As the second bearing 336, a plain bearing may be adopted or a rolling bearing as depicted in FIG. 11 may be adopted. The speed reducer housing 25 supports the output shaft member 357 via a third bearing 337 so that the output shaft member 357 is rotatable.

The inner ring 304 is externally fixedly fitted over the outer periphery of the inner shaft 29. The inner ring 304 is configured equivalently to the inner ring 104 except that the inner ring 304 is coupled to the inner shaft 29 rather than to the output shaft 16.

The two-way clutch 306 according to the third embodiment includes the first pressing member 131 (see FIG. 3 or any other relevant figure) and the second pressing member 132 (see FIG. 3 or any other relevant figure). However, a first mating sliding contact surface (corresponding to the first mating sliding contact surface 138 according to the first embodiment; see FIG. 3 or any other relevant figure) of each first pressing portion of the first pressing member 131 faces the opposite side in the axial direction X to a side that the first mating sliding contact surface 138 according to the first embodiment faces. A second mating sliding contact surface (corresponding to the second mating sliding contact surface 143 according to the first embodiment; see FIG. 3 or any other relevant figure) of each second pressing portion of the second pressing member 132 faces the opposite side in the axial direction X to a side that the second mating sliding contact surface 143 according to the first embodiment faces.

That is, in the third embodiment, the first mating sliding contact surface formed on a surface of each first pressing portion located on the first circumferential direction Y1 side thereof has a surface that is recessed in the second circumferential direction Y2 as the surface extends in the second axial direction X2 (predetermined axial direction). The second mating sliding contact surface formed on a surface of each second pressing portion located on the second circumferential direction Y2 side thereof has a surface that is recessed in the first circumferential direction Y1 as the surface extends in the second axial direction X2.

The driving portion 352 includes an annular solenoid 354 and an actuating member 355. The annular solenoid 354 is an example of the driving force generating portion 353. The actuating member 355 receives an electromagnetic force (driving force) from the driving force generating portion 353 to actuate the mechanical portion 351. The solenoid 354 is disposed in the first space Sa, which is the lower portion of the internal space S of the housing H, and on the first axial direction X1 side with respect to the two-way clutch 306 (mechanical portion 351). More specifically, the solenoid 354 is disposed on the first axial direction X1 side with respect to the outer ring 305 and the inner ring 304. That is, the driving force generating portion 353 and the mechanical portion 351 are disposed in this order from the first axial direction X1 side toward the second axial direction X2 side.

The solenoid 354 has a circular-ring-shaped coil 356a and a core 356b. The coil 356a is provided coaxially with the steering shaft 10 (see FIG. 1). The coil 356a is wound around the core 356b. An inner peripheral portion of the solenoid 354 functions as an attracting portion that attracts armatures 326 described below. The actuating member 355 includes the armatures 326 that are identical in number to the roller pairs 123 (see FIG. 3 or any other relevant figure). Each of the armatures 326 according to the third embodiment is configured equivalently to each of the wedge members 126 according to the first embodiment except for the material of the armature. Each armature 326 is formed of a magnetic material. Each armature 326 is inserted between the corresponding first pressing portion 135 and the corresponding second pressing portion 140 for the adjacent roller pair 123.

In the third embodiment, the orientation of each armature 326 in the axial direction X is opposite to the orientation of each wedge member 126 according to the first embodiment. The armature 326 comes into sliding contact with the first and second pressing members 131, 132 from the first axial direction X1 side. In other words, the first sliding contact surface 153, which comes into sliding contact with the first mating sliding contact surface 138 has a surface protruding in the second circumferential direction Y2 as the surface extends in the second axial direction X2. The second sliding contact surface 154, which comes into sliding contact with the second mating sliding contact surface 143, has a surface protruding in the first circumferential direction Y1 as the surface extends in the second axial direction X2. That is, the first and second sliding contact surfaces 153, 154 of the armature 326 are configured such that the surfaces protrude in the opposite first and second circumferential directions Y1, Y2 as they extend in the second axial direction X2 (predetermined direction).

In the third embodiment as well, the second space Sb, which is the upper portion of the internal space S in the housing H, is a narrow space, as is the case with the first and second embodiments. Thus, it is impossible to dispose a part of the clutch mechanism 315 (for example, the solenoid 354) in the second space Sb. To allow the clutch mechanism 315 to be engaged, power feeding to the solenoid 354 is turned off. In this state, the solenoid 354 does not attract the armatures 326 in the first axial direction X1. Thus, each armature 326 is placed in a first position (the position depicted by a continuous line in FIG. 11). With the armature 326 placed in the first position, the first rollers 123*a* (see FIG. 3) and the second rollers 123*b* (see FIG. 3) are each engaged with an outer periphery of the inner ring 304 and an inner periphery of the outer ring 305. Thus, the two-way clutch 306 is engaged.

On the other hand, to allow the clutch mechanism 315 to be disengaged, the power feeding to the solenoid 354 is turned on. When the power feeding to the solenoid 354 is switched on, each armature 326 is attracted by the clutch mechanism 315 and drawn in the first axial direction X1 to move in the first axial direction X1 (for example, approximately 1 to 2 mm). As a result, the armature 326 is placed in a second position (the position depicted by a dashed line in FIG. 11) located on the first axial direction X1 side with respect to the first position. With the armature 326 placed in the second position, the first rollers 123*a* and the second rollers 123*b* are each disengaged from the outer periphery of the inner ring 304 and the inner periphery of the outer ring 305. As a result, the two-way clutch 306 is released.

The three embodiments of the invention have been described. However, the invention may be carried out in any other forms. For example, in the above-described embodiments, the driving force generating portion 53, 253, 353 drives the mechanical portion 51 351 by use of an electromagnetic force resulting from conduction of a current through the coil 56*a*, 256*a,r* 356*a*. However, as depicted in FIG. 12, a driving force generating portion 53A may generate a driving force by use of oil pressure.

Figure 12:
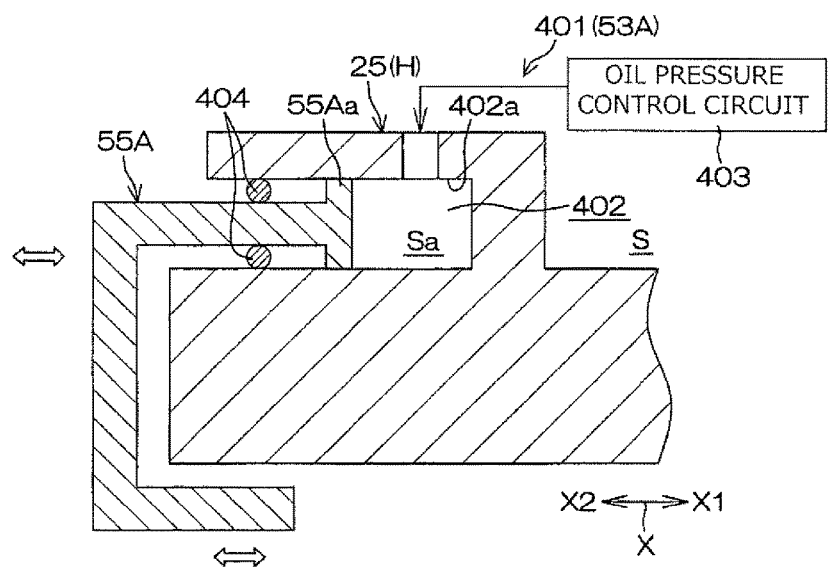
FIG. 12 is a schematic sectional view depicting a first variation of the steering system.

In a first variation depicted in FIG. 12, the driving force generating portion 53A includes an oil pressure generating portion 401. In the oil pressure generating portion 401, a part of the housing H (for example, the speed reducer housing 25) is sealed in a liquid tight manner to define an oil chamber 402. The driving force generating portion 53A further includes an oil pressure control circuit 403 that controls the oil pressure in the oil chamber 402. In this case, an actuating member 55A is a member extending in the axial direction X and movable in the axial direction X. The actuating member 55A and the housing H (for example, the speed reducer housing 25) are slidable relative to each other. An end 55Aa of the actuating member 55A located on the first axial direction X1 side thereof is fitted in the oil chamber 402. A circular-ring-shaped seal 404 creates a seal between a peripheral surface 402*a* of the oil chamber 402 and the actuating member 55A.

The oil pressure generating portion 401 is housed and disposed in the first space Sa included in the internal space S in the housing H. Control by the oil pressure control circuit 403 allows oil pressure to be applied to the actuating member 55A via the oil chamber 402. The applied pressure allows the actuating member 55A to move in the axial direction X. Movement of the actuating member 55A in the axial direction X switches the clutch mechanism 15, 215, 315 between the engaged state and the released state.

Figure 13:
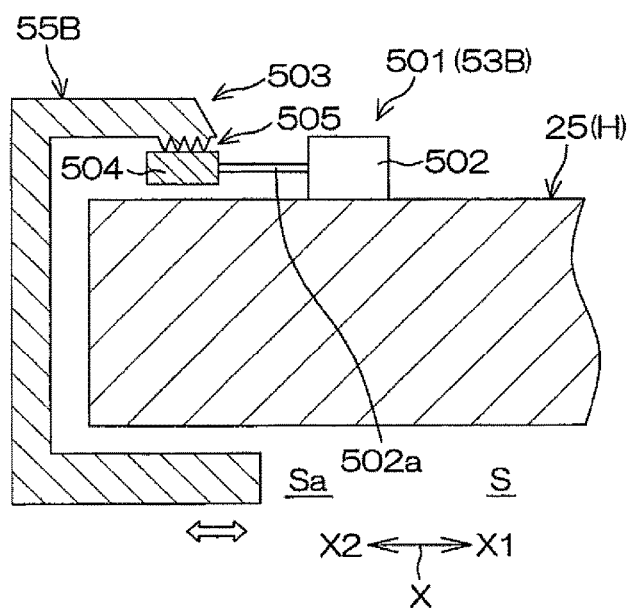
FIG. 13 is a schematic sectional view depicting a second variation of the steering system.

In the first variation, the oil pressure generating portion 401 is used as the driving force generating portion 53A. As compared to a configuration in which the solenoid 54, 254, 354 is adopted as the driving force generating portion 53A, the configuration in the first variation allows avoiding the adverse effect of electromagnetic fields on the torque sensor 21 and the first bearing 50. As depicted in FIG. 13, a driving force generating portion 53B may generate a driving force by use of an output from a motor.

In a second variation depicted in FIG. 13, the driving force generating portion 53B includes an electric driving portion 501. An actuating member 55B is a member extending in the axial direction X so as to be movable in the axial direction X. The electric driving portion 501 includes a second motor 502 and a second speed reducer 503. The second speed reducer decelerates output rotation of the second motor 502. The second speed reducer 503 includes a drive gear 504 and a driven gear 505. The drive gear 504 is formed on an output shaft 502*a* of the second motor 502. The driven gear 505 is formed on the actuating member 55B so as to be rotatable integrally with the actuating member 55B and meshes with the drive gear 504.

The second speed reducer 503 amplifies the output rotation of the second motor 502 and converts the output rotation into a driving force of the actuating member 55B in the axial direction X. The drive gear 504 may be, for example, pinion teeth. The driven gear 505 may be, for example, rack teeth aligned along the axial direction X. Rotational driving performed by the second motor 502 moves the actuating member 55B in the axial direction X. Movement of the actuating member 55B in the axial direction X switches the clutch mechanism 15, 215, 315 between the engaged state and the released state.

In the second variation, the electric driving portion 501 is used as the driving force generating portion 53B. Thus, as compared to a configuration in which the solenoid 54, 254, 354 is adopted as the driving force generating portion 53B, the configuration in the second variation allows avoiding the adverse effect of electromagnetic fields on the torque sensor 21 and the first bearing 50. While the power feeding to the second motor 502 is stopped, the output shaft 502a does not rotate. Consequently, the clutch mechanism 15, 215, 315 can be kept engaged or released without using energy (electric power).

Figure 14:
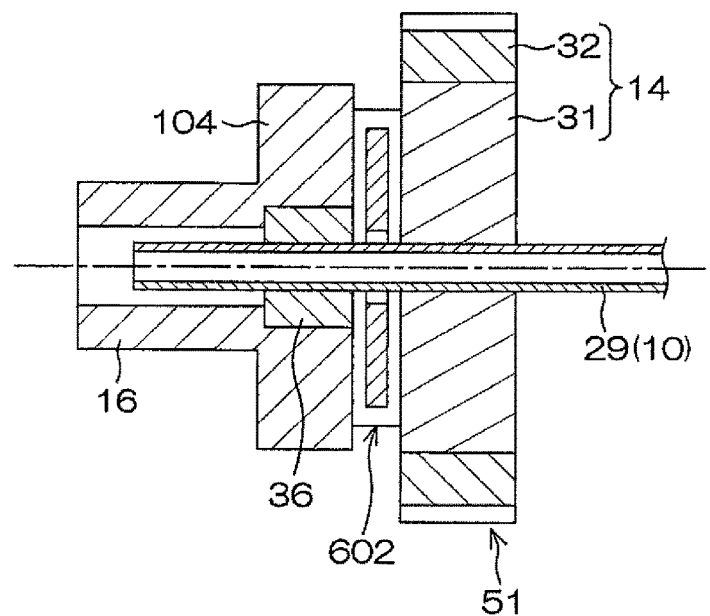
FIG. 14 is a schematic sectional view depicting a third variation of the steering system.

As described above, the mechanical portion 51 (see FIG. 2) is the two-way clutch 106. However, the mechanical portion 51 may be configured to include a friction clutch 602 as depicted in FIG. 14. Although FIG. 14 illustrates that a single disc clutch is used as the friction clutch 602, any other clutch such as a multi-disc clutch may be adopted. The mechanical portion 51 may be configured to include a positive clutch 603 as depicted in FIG. 15.

Figure 15:
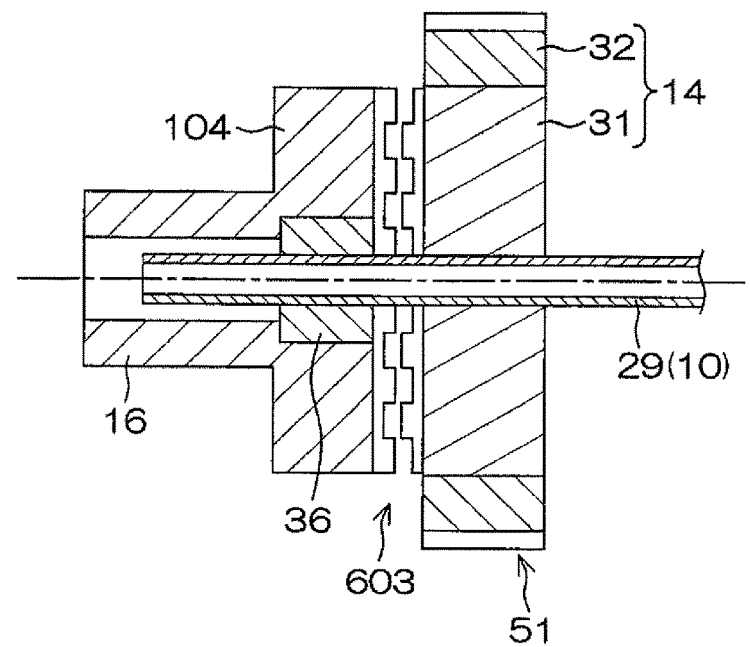
FIG. 15 is a schematic sectional view depicting a fourth variation of the steering system.
Figure 16:
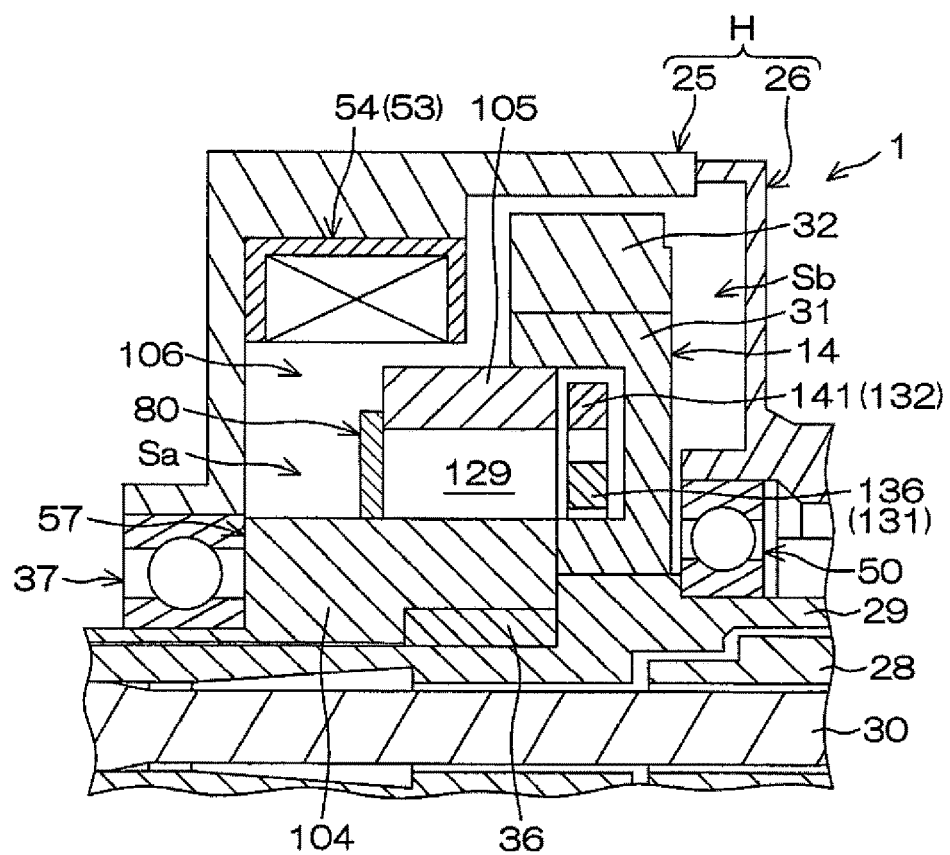
FIG. 16 is a schematic sectional view depicting a fifth variation of the steering system.

The variations depicted in FIG. 14 and FIG. 15 may be applied to the mechanical portion 351 (see FIG. 10). In the first embodiment, as depicted in FIG. 16, an annular seal member 80 may be provided which creates a seal between a lower surface of the outer ring 105 of the two-way clutch 106 and a lower surface of the inner ring 104 of the two-way clutch 106. The seal member 80 includes a contact seal.

The wedge spaces 129 are filled with a clutch lubricant that lubricates a frictional surface of the two-way clutch 106. The clutch lubricant exhibits a very high viscosity unlike a lubricant contained in the worm wheel housing portion 35 and lubricates meshing portions of the worm shaft 13 and the worm wheel 14. Thus, when the clutch lubricant leaks from any of the wedge spaces 129 and reaches the meshing portions of the worm shaft 13 and the worm wheel 14, the lubrication of the meshing portions may be adversely affected. Thus, the seal member 80 is used to prevent the lubricant from flowing out from the wedge spaces 129.

Figure 17:
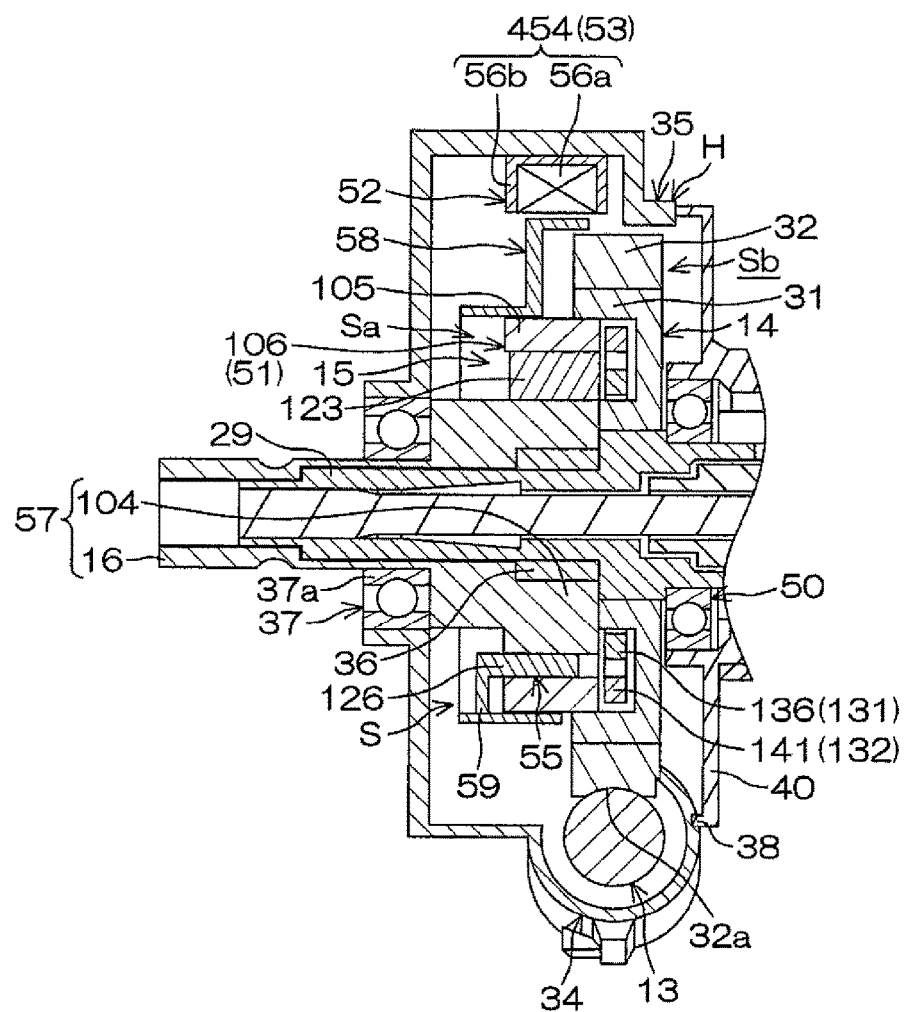
FIG. 17 is a schematic sectional view depicting a sixth variation of the steering system.

The seal member 80 may be applied to the second embodiment and the third embodiment. As depicted in FIG. 17, at least a part of a solenoid 454 and the worm wheel 14 may be disposed to overlap in the axial direction of the steering shaft 10. In the first to third embodiments, the worm wheel 14 and the worm shaft 13 configures a reduction mechanism, and the solenoid 54 is shaped like a circular ring disposed coaxially with the steering shaft 10. Thus, disposing the solenoid 54 in such a manner causes the worm shaft 13 and the solenoid 54 to interfere with each other. In the present variation, for example, the cylindrical solenoid 454 is disposed at a position where the solenoid 454 avoids interfering with the worm shaft 13, with a bottom surface or a top surface of the solenoid 454 located opposite to an outer periphery of a cylindrical surface (outer peripheral surface) of the armature 58 at a predetermined distance from the outer periphery. The armature 58 is also shaped so as not to interfere with the worm shaft 13, for example, by cutting off a portion of the armature 58 that otherwise interferes with the worm shaft 13, along a plane parallel to the steering shaft 10. This enables the solenoid 454 to be disposed within a predetermined range of outer peripheral area of the armature 58. The solenoid 454 can be disposed in an outer peripheral area of the worm wheel 14 with a force maintained which is needed to pull the actuating member 55 to engage or release the two-way clutch 106. This enables a reduction in axial dimensions.

As described above, the sensor housing 26 and the speed reducer housing 25 are included in the housing H. However, the housing H may be optionally configured so long as the housing H includes at least the speed reducer housing 25. That is, the housing H need not house the torque sensor 21 so long as the housing H houses the first speed reducer 12. Therefore, the invention is applicable to a steering system with no torque sensor.

In the first to third embodiments, the worm wheel 14 (gear) corresponds to a rotating member, and the worm wheel 14 and the worm shaft 13 correspond to the reduction mechanism. However, instead of the worm wheel 14 (gear), a reduction mechanism including a pulley and a belt may be adopted. For example, the reduction mechanism can be configured by providing the motor shaft and the steering shaft 10 with respective pulleys that can rotate along with the motor shaft and the steering shaft 10, and passing a belt around each of the pulleys. In this case, the pulley provided for the steering shaft 10 corresponds to the rotating member. In this case as well, the pulleys may be provided with annular grooves similar to the annular grooves in the above-described embodiments to allow application of the clutch mechanisms in the above-described embodiments and variations.

In the above-described first to third embodiments and variations thereof, the clutch mechanism (clutch mechanism 15 or the like) is housed in the internal space in the housing H provided in the steering column 5. However, the invention may also be applied to a steering system in which the motor 11 and a reduction mechanism including the worm shaft 13 and the worm wheel 14 are provided on the steered shaft housing 9 side.

By way of example, the worm wheel 14 is used as the gear that is attached to the steering shaft 10 so as to be rotatable integrally with the steering shaft 10. However, as this gear, any other type of gear may be adopted. Various other modifications may be made to the invention within the scope of the claims.

What is claimed is:

1. A steering system comprising:
   a steering shaft that transmits rotation of a steering member;
   a steering operation mechanism that steers steered wheels;
   a housing having an internal space in which at least a part of the steering shaft is housed;
   an output shaft that is rotatable relative to the steering shaft and coupled to the steering operation mechanism; and
   a clutch mechanism having: (i) a mechanical portion configured to couple and uncouple the steering shaft and the output shaft from each other, and (ii) a driving force generating portion that generates a driving force allowing the mechanical portion to couple the steering shaft and the output shaft together and to uncouple the steering shaft and the output shaft from each other, the clutch mechanism enabling and disabling transmission of power between the steering shaft and the output shaft, wherein
   the clutch mechanism is housed and disposed in the internal space in the housing.

2. The steering system according to claim 1, further comprising:
   a transmission mechanism that transmits at least rotation or torque to the steering shaft or to which at least rotation or torque is transmitted through the steering shaft, wherein
   the housing houses the transmission mechanism in the internal space.

3. The steering system according to claim 1, further comprising:
   a gear that is attached to the steering shaft so as to be rotatable integrally with the steering shaft, wherein
   the housing houses at least the gear.

4. The steering system according to claim 1, wherein in the internal space, the driving force generating portion is disposed radially outward of the mechanical portion.

5. The steering system according to claim 1, wherein the mechanical portion includes a two-way clutch, and the two-way clutch includes:
- an inner ring coaxially coupled to one of the steering shaft and the output shaft;
- an outer ring coaxially coupled to other of the steering shaft and the output shaft, and rotatable relative to the inner ring;
- a roller pair having rollers that are disposed in a circumferential direction of the inner ring in a wedge space formed by an outer periphery of the inner ring and an inner periphery of the outer ring; and
- a pair of pressing portions, the pressing portions being rotatable relative to each other around the steering shaft and moved in opposite predetermined directions to press the rollers of the roller pair in directions such that the rollers approach one another.

6. The steering system according to claim 5, wherein the clutch mechanism further has an actuating member allowing the mechanical portion to be actuated by receiving a driving force from the driving force generating portion, and
the actuating member is movable in an axial direction of the steering shaft such that the movement in the axial direction moves the pair of pressing portions in opposite directions.

7. The steering system according to claim 6, wherein the pair of pressing portions includes a first pressing portion and a second pressing portion,
the actuating member includes a first sliding contact surface that comes into sliding contact with the first pressing portion and a second sliding contact surface that comes into sliding contact with the second pressing portion, and
the first and second sliding contact surfaces include respective portions that protrude in opposite circumferential directions as they extend in a predetermined axial direction of the steering shaft.

8. The steering system according to claim 5, wherein the gear is a rotating member.

9. The steering system according to claim 5, wherein
a transmission mechanism is a speed reducer and further has a gear that is attached to the steering shaft so as to be rotatable integrally with the steering shaft,
the inner ring is coupled to the output shaft, and
the outer ring is coupled to the steering shaft, and the outer ring is fixed to the gear.

10. The steering system according to claim 1, wherein the mechanical portion includes a friction clutch.

11. The steering system according to claim 1, wherein the mechanical portion includes a positive clutch.

12. The steering system according to claim 1, wherein the driving force generating portion drives the mechanical portion using an electromagnetic force resulting from conduction of a current through a coil.

13. The steering system according to claim 1, wherein the driving force generating portion drives the mechanical portion using oil pressure.

14. The steering system according to claim 1, further comprising:
a seal member that seals an interior of the mechanical portion.

15. The steering system according to claim 2, wherein the transmission mechanism is a speed reducer.

16. The steering system according to claim 5, wherein the inner ring is coupled to the steering shaft.

17. The steering system according to claim 5, wherein the outer ring is coupled to the output shaft.

* * * * *